(12) United States Patent
Garbagnati et al.

(10) Patent No.: US 12,214,964 B2
(45) Date of Patent: Feb. 4, 2025

(54) CURVILINEAR CONVEYOR CHAIN SUITABLE FOR RUNNING ALONG A GUIDE COMPRISING AT LEAST ONE CURVED SECTION

(71) Applicant: REGINA CATENE CALIBRATE S.P.A., Milan (IT)

(72) Inventors: Carlo Garbagnati, Castello di Brianza (IT); Norberto Cattaneo, Usmate Velate (IT)

(73) Assignee: REGINA CATENE CALIBRATE S.P.A., Milan (IT)

( * ) Notice: Subject to any disclaimer, the term of this patent is extended or adjusted under 35 U.S.C. 154(b) by 120 days.

(21) Appl. No.: 18/084,246

(22) Filed: Dec. 19, 2022

(65) Prior Publication Data

US 2023/0192407 A1    Jun. 22, 2023

(30) Foreign Application Priority Data

Dec. 21, 2021   (IT) ........................ 102021000031997

(51) Int. Cl.
| | | |
|---|---|---|
| *B65G 17/06* | (2006.01) | |
| *B65G 17/08* | (2006.01) | |
| *B65G 17/42* | (2006.01) | |

(52) U.S. Cl.
CPC .......... *B65G 17/086* (2013.01); *B65G 17/42* (2013.01)

(58) Field of Classification Search
CPC ....... B65G 17/086; B65G 17/06; B65G 17/42
USPC ................ 198/840, 841, 850, 851, 852, 853
See application file for complete search history.

(56) References Cited

U.S. PATENT DOCUMENTS

| | | |
|---|---|---|
| 3,262,550 A | 7/1966 | Kampfer |
| 4,096,943 A | 6/1978 | Gentsch |
| 4,961,492 A | 10/1990 | Wiseman et al. |
| 5,127,515 A * | 7/1992 | Damkjaer .............. B65G 21/20 |
| | | 198/840 |

(Continued)

FOREIGN PATENT DOCUMENTS

| | | |
|---|---|---|
| EP | 0527584 B1 | 4/1996 |
| EP | 0711714 A1 | 5/1996 |

(Continued)

OTHER PUBLICATIONS

International Search Report; International Application No. IT202100031997; Date of Completion of Search Jul. 22, 2022; 3 pages.

*Primary Examiner* — Douglas A Hess
(74) *Attorney, Agent, or Firm* — CANTOR COLBURN LLP

(57) ABSTRACT

A link of a curvilinear conveyor chain suitable for running along a guide includes a plate body having a first surface forming a plane for resting and supporting products to be transported, a second surface substantially flat and defining at least one plane for resting and sliding on at least one respective support surface of a raceway of straight sections of the guide, an articulation portion extending below the first surface and substantially in the middle of the plate body, and at least one pair of housings transverse to the travel direction of the chain and each adapted to accommodate a respective articulation pin of the link with similar links. The link has at least one substantially flat reaction surface with at least one section extending above the second surface of the plate body interpenetrating it.

20 Claims, 14 Drawing Sheets

(56) References Cited

U.S. PATENT DOCUMENTS

| | | | | |
|---|---|---|---|---|
| 5,178,263 A * | 1/1993 | Kempen | ................ | B65G 21/02 |
| | | | | 198/860.3 |
| 5,307,923 A * | 5/1994 | Damkjaer | ............ | B65G 17/086 |
| | | | | 198/852 |
| 5,404,997 A * | 4/1995 | Schreier | ............... | B65G 47/268 |
| | | | | 198/779 |
| 5,779,027 A * | 7/1998 | Ensch | .................... | B65G 21/22 |
| | | | | 198/841 |
| 6,164,439 A | 12/2000 | Stebnicki et al. | | |
| 6,196,380 B1 * | 3/2001 | Teuber | ................... | B65G 17/44 |
| | | | | 198/853 |
| 6,382,405 B1 * | 5/2002 | Palmaer | ............ | B65G 17/086 |
| | | | | 198/853 |
| 6,820,737 B2 * | 11/2004 | Koeda | .................... | B65G 21/22 |
| | | | | 198/860.1 |
| 9,016,467 B2 * | 4/2015 | Bettati | ................ | B65G 17/086 |
| | | | | 198/850 |
| 9,102,476 B2 * | 8/2015 | Musick | ................... | B65G 21/22 |
| 9,650,211 B1 * | 5/2017 | Layne | .................... | B65G 17/08 |
| 11,332,315 B2 * | 5/2022 | Andreoli | ................ | B65G 17/44 |
| 2004/0011628 A1 | 1/2004 | Koeda et al. | | |
| 2017/0096302 A1 | 4/2017 | Balk | | |

FOREIGN PATENT DOCUMENTS

| | | | |
|---|---|---|---|
| EP | 0903307 | A1 | 3/1999 |
| GB | 1256590 | A | 12/1971 |
| GB | 2108920 | A | 5/1983 |
| GB | 2153323 | A | 8/1985 |
| IT | 940731 | U1 | 5/1996 |
| WO | 2016131879 | A1 | 8/2016 |
| WO | 2019016716 | A1 | 1/2019 |

\* cited by examiner

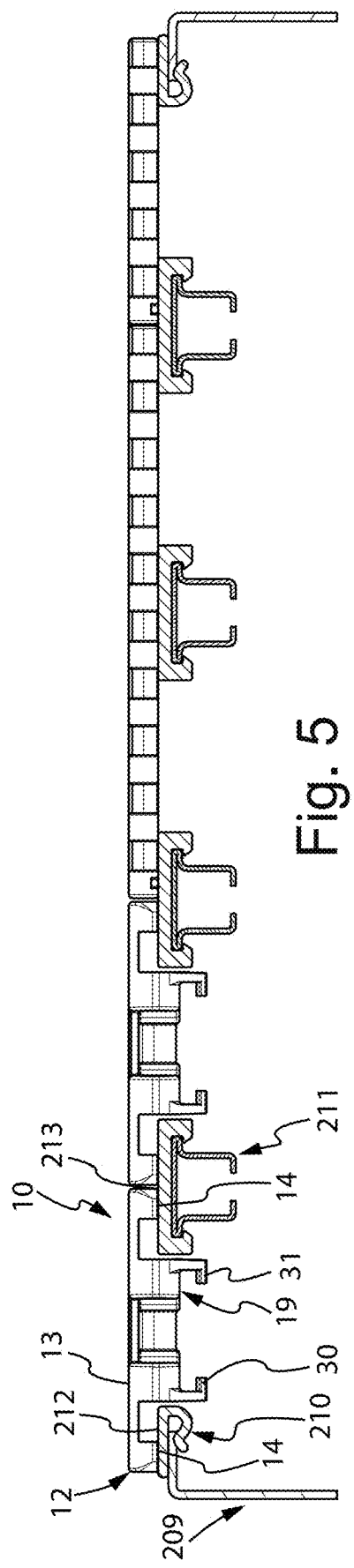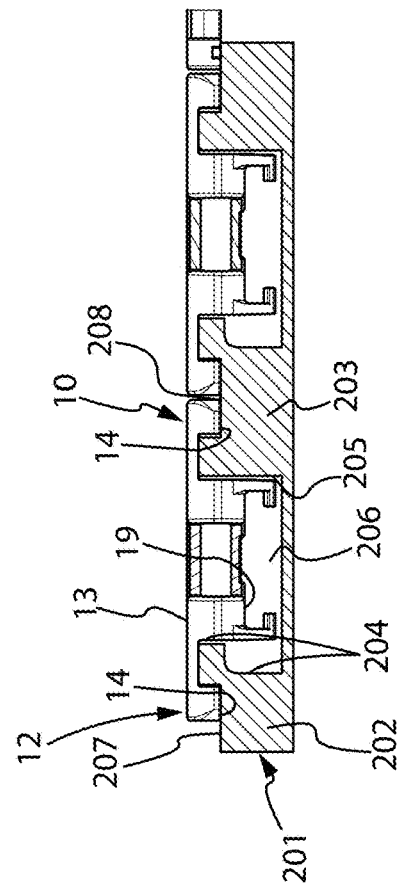

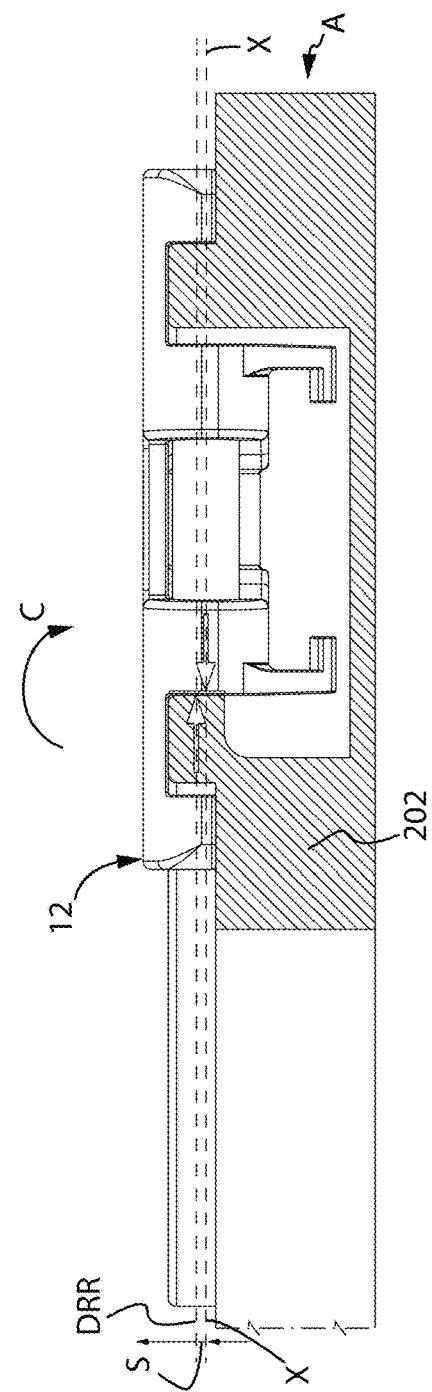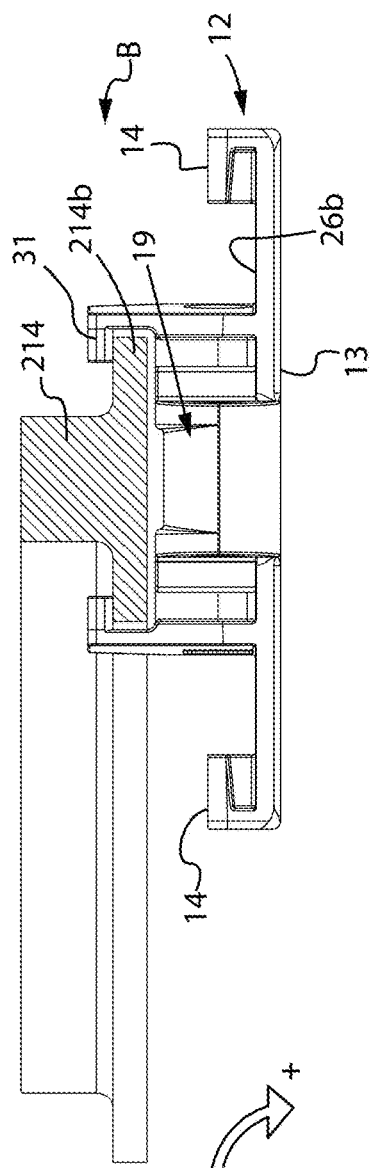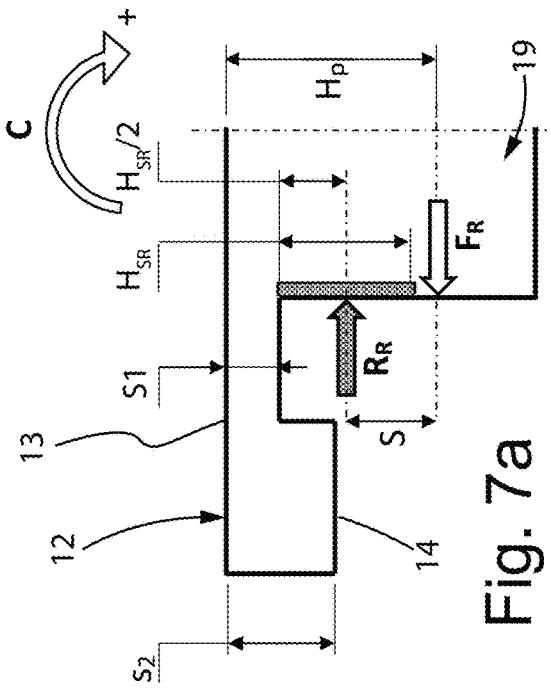
Fig. 7
Fig. 7a

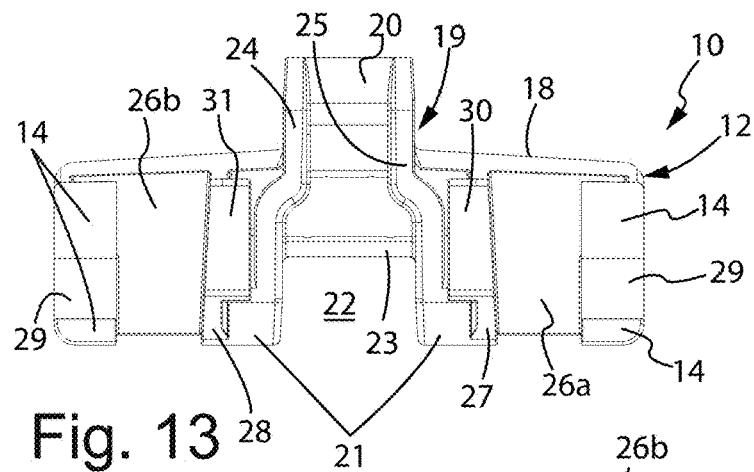
Fig. 13
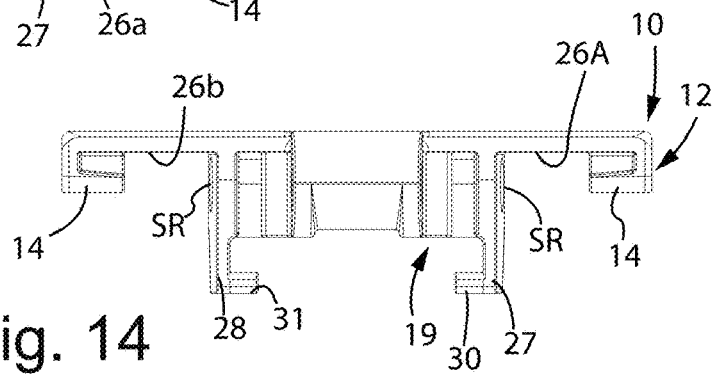
Fig. 14
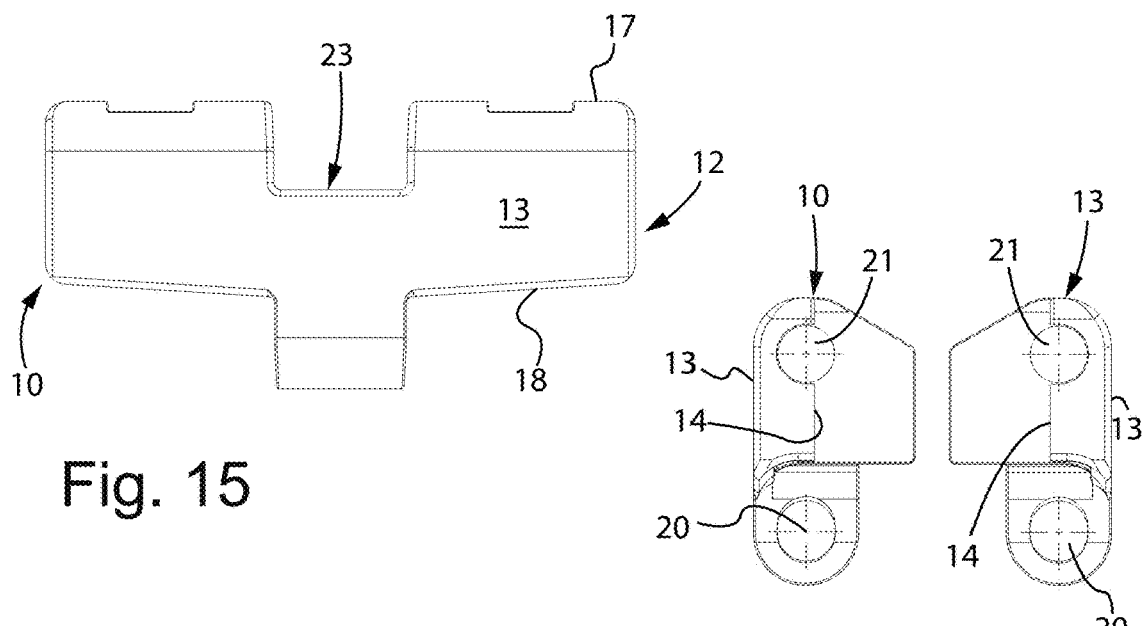
Fig. 15
Fig. 16
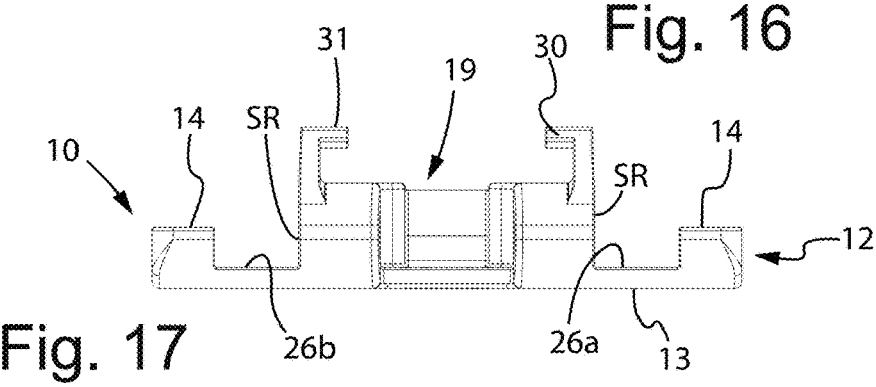
Fig. 17

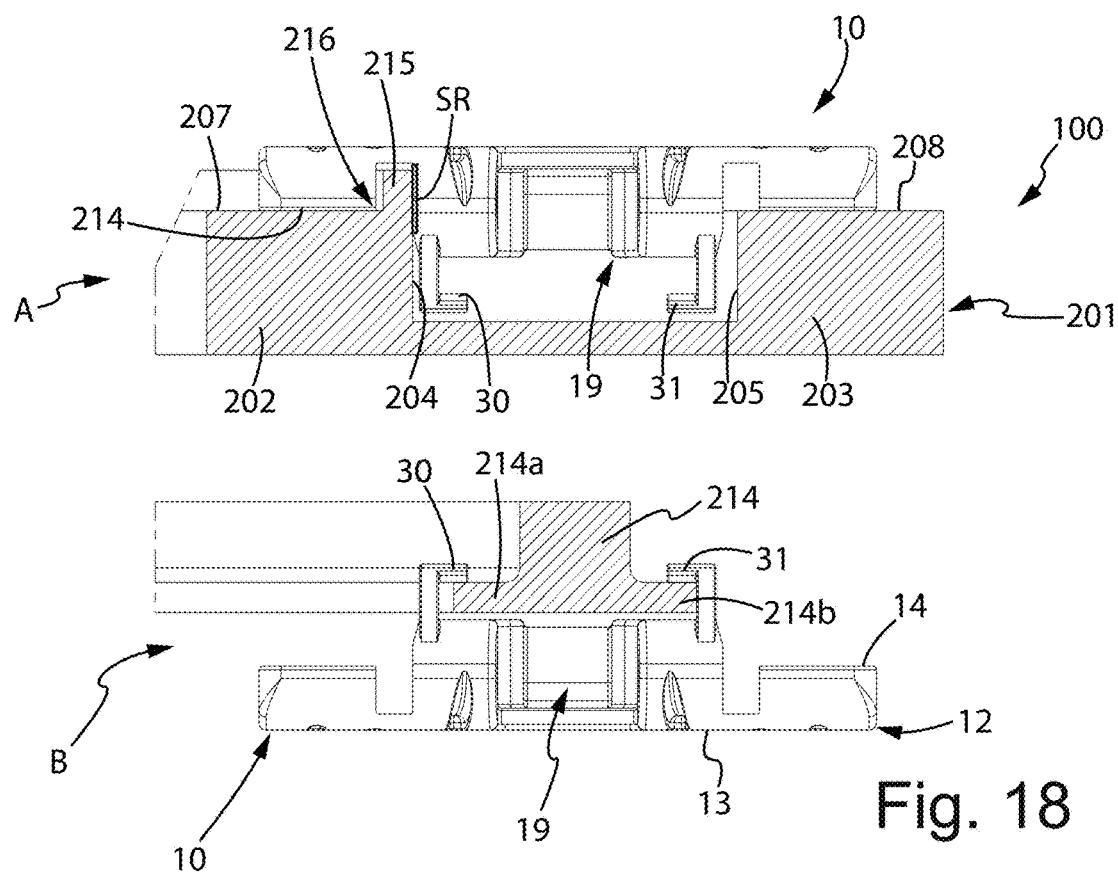
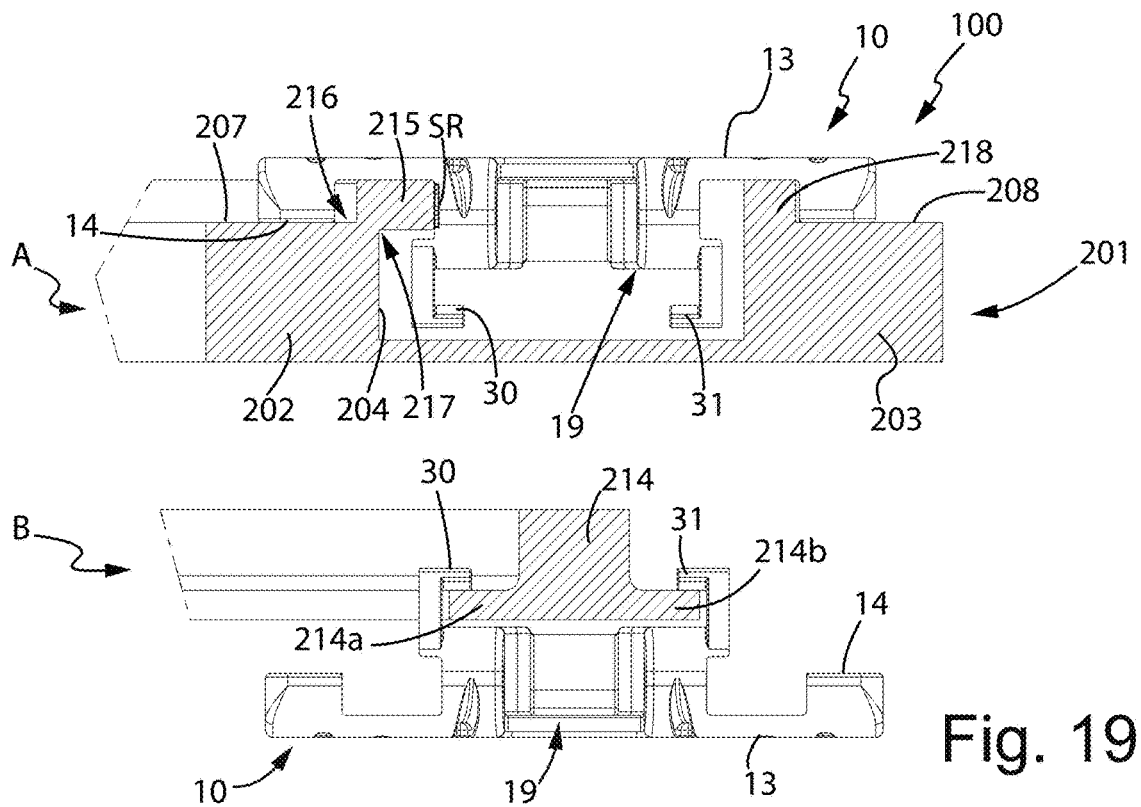
Fig. 18
Fig. 19

CURVILINEAR CONVEYOR CHAIN SUITABLE FOR RUNNING ALONG A GUIDE COMPRISING AT LEAST ONE CURVED SECTION

CROSS-REFERENCE TO RELATED APPLICATIONS

This application is related to and claims the benefit of Italian Patent Application No. 102021000031997, filed on Dec. 21, 2021, the contents of which are herein incorporated by reference in their entirety.

TECHNICAL FIELD

The present disclosure relates to a curvilinear conveyor chain suitable for running along a guide comprising at least one curved section, the relative links and the relative curved guide supports.

BACKGROUND

Curvilinear conveyor chains are known in the art to be commonly used to transport products along a path which has at least one curved section. Chains of such a type are also known as 'side-flexing'.

Such chains comprise a plurality of links which are interconnected by articulation pins and which form an articulated transport plane. Each link comprises a plate body which extends transversely to the running direction and whose upper surface defines the plane for supporting and transporting the products. A central articulation portion protrudes below the plate body, the central articulation portion has at least one pair of transverse housings into which respective articulation pins can be inserted to interconnect the link to similar links, respectively before and after it, with a respective cylindrical hinge.

At least at the curved sections, the guide generally has a U-like shape which identifies a central channel in which the articulation portions of the links run, while the plate bodies have their respective ends resting and sliding on the upper surfaces of the guide bodies which form the arms of the U.

During normal operation, the tensile action of the chain generates radial forces which tend to tilt the conveyor plane formed by the links towards the inside of the curve, and the links then lift at the outer side of the curve. Such radial forces, so-called overturning forces, cause the chain to slide unevenly, cause instability of the products resting thereon and, in the worst case, can cause the chain to exit from the curved guide with risks to the safety of the plant and the operators.

Several solutions have long been known to limit such an undesirable effect.

One solution consists in the provision of mechanical stops such as retention tabs which protrude in a direction transverse to the chain running direction and which can be opposed to each other (i.e., directed towards the outside of the link), as for example described in GB2108920 or U.S. Pat. No. 4,096,943, or facing each other (i.e., directed towards each other), as for example described in EP0711714A (ITMI942255A1) or ITMI940731U1, and engaging with corresponding projections obtained in the guide. In the contact between the tabs of the links and the projections of the guide, reaction forces are generated which are directed orthogonally to the product support plane and which oppose the lifting of the links on the outer side of the curve. One such solution, commonly known as 'tab' and 'reverse tab' is not completely satisfactory.

In the case in which the tabs are opposite each other ('tab'), the links do not however remain level and tend to rise at the outer side of the curve due to the clearance necessarily existing between the tabs of the links and the corresponding projections of the guide. Clearances which cannot be reduced beyond a certain limit, both to avoid problems with jamming and due to construction tolerances, and which are further accentuated by wear and tear in use. In curves, therefore, the chain is not stable and undergoes oscillations which can compromise the stability of the products. Furthermore, if the conveyor is of the 'multi-way' type, with several conveyor chains side-by-side, differences in level between the respective conveyor planes are formed, causing products to trip and jam. Furthermore, such chains are noisy and non-removable (both in curves and in straight sections). In fact, the links of these chains have opposing tabs forming an inverted T to engage in a complementary channel obtained in the guide and having longitudinal projections facing each other which superimpose the tabs of the links. Therefore, the chain links can only be removed from the guide by pulling them out along the running direction, and the replacement of even one link involves disassembling the conveyor and pulling the chain out of the guide.

If the tabs are facing each other ('reverse tab'), it is possible to disassemble the chain links by pulling them out of the guide from above in a direction orthogonal to the running direction. However, pulling them out in such a manner is only possible after having moved the links laterally to the guide, so it is possible in the event of a one-way conveyor, but problematic and difficult in the event of a multi-way conveyor.

Furthermore, such a type of chain ('reverse tab') requires specially shaped curved guides (other than 'U-like' guides) which have a central portion which inserts between the tabs of the links and on top of which the links themselves rest and slide. On the side of the guide central portion defining the outer side of the curve, a transverse projection is obtained which is adapted to interact with the corresponding tab of the links. The links are therefore resting and running along a surface which is not symmetrical with respect to the transverse median plane of the links, which causes instability of the chain and products. In use, problems have then been encountered with functionality due to the reaction in the outer side of the curve.

Another well-known solution is to provide a pair of walls which protrude below the plate body and whose outer lateral surfaces are shaped inclined or chamfered so as to form a non-zero angle with the vertical direction, so that on contact with copying abutment surfaces obtained in the curved guide, a reaction force is generated which opposes the tilting. Such type of chains, known in the industry as 'bevels', is for example described in GB2153323, U.S. Pat. No. 3,262,550 and others.

Such type of chain ('bevel'), although easily disassembled even in curves, require a plate to contain and support the links along the return path, resulting in wear of the upper surface of the plate bodies which forms the support surface of the products. On the other hand, such a containment plate is not necessary in the case of 'tab' or 'reverse tab' chains as described above, whose retention tabs are also used to support the chain along the return path, a shaped support being provided for such a purpose, to which the (inverted) links are hung by means of the retention tabs.

The chains of the 'bevel' type also offer no guarantee of stability, in fact a limited degree of wear on the contact surfaces between the guides and links is sufficient to nullify the anti-tilting effect.

A further known solution is to retain the chain in the curve with a magnetic system. Magnets are provided along the guide, which are for example housed in the guide bodies which form the arms of the 'U' or arranged therebetween at the bottom of the 'U' and whose magnetic field interacts with the chain, generating a retention force which opposes the lifting and tilting of the chain on the outer side of the curve.

Such a solution, although easily unassemblable and effective in retaining the chain in curves even in the event of high wear of the slide channel, is nevertheless expensive. Furthermore, it limits the load-bearing capacity of the chain due to the retention force exerted by the magnets, which opposes chain drag. Such a solution further requires that the links and/or articulation pins are necessarily made of materials capable of reacting to the magnetic field. Generally, the links are made of thermoplastic material and the articulation pins of ferromagnetic material (e.g., ferritic stainless steel). It therefore does not allow the chains to be made entirely of plastic material or to use non-magnetic steels for the pins, as could for example be required by special conditions of use of the chains.

Such solutions are known from numerous prior art documents including, but not limited to, EP0903307, WO2019016716A and WO2016131879A.

A further known solution exploits the height offset between the articulation pins of the links, along whose axis the radial force resulting from the tensile action in the curve acts, and the direction along which the reaction force generated in the contact between the lateral surface of the guide defining the inner side of the curve and the corresponding reaction surface obtained on the chain links acts. By offsetting the position of the straight line along which the radial reaction force acts at a greater height—i.e., upwards (i.e., towards the upper product supporting and transport surface), considering the chain in product transport conditions—with respect to the longitudinal axes of the articulation pins, a torque is generated which opposes the chain tilting.

Such a solution, known in the industry as 'LPC' (Low Pin Centreline) is known for example from EP0527584B1.

The known 'LPC'-type solutions involve increasing the height of the articulation portion which extends below the lower surface of the plate body of the links, so that the articulation pin housings can be made at a greater distance from the lower surface of the plate bodies than in other known chain types (e.g., 'tab', 'bevel' or magnetic). In such known 'LPC' chains, the plate bodies have their respective lower surface resting and sliding on the top surface of the guide bodies. The articulation portion protrudes completely below such a lower surface, the side of said portion on the inner side of the curve forms a reaction surface which contacts the lateral surface of the guide forming the inner side of the curve. The radial reaction force which is generated in the contact between the side of the articulation portion and the lateral surface on the inner side of the curve acts along a direction which is essentially at the centreline (with respect to the extension in height) of the reaction surface. By making the articulation pin housings below such a centreline, a torque is generated which acts on the link in the direction of the retention thereof in curves (anti-tilt).

Such a known solution ('LPC') allows the chain to be effectively stabilised in curves, ensuring the possibility of disassembling the chain in curves by lifting the links from above in a direction orthogonal to the product support plane. However, in the known 'LPC' solutions, where the distance between the articulation pins and the lower surface of the plate bodies resting and sliding along the upper surfaces of the guide is increased, the chain links have a significantly greater overall height than those of the other known chain types ('tab', 'bevel', magnetic), with differences of around 7 mm, reaching overall heights of around 28-32 mm.

This leads to a higher use of materials and therefore to higher costs for the production of the chains and guide bodies, which must be correspondingly sized, and to an increase in the overall weight of the chain.

The known 'LPC'-type chains also require a plate to contain and support the links along the return path, resulting in uneven wear of the upper surface of the plate bodies forming the product support surface.

The known curvilinear chains also generally have stainless steel articulation pins (ferritic or martensitic with magnetic retention solutions) to ensure a minimum working load in line with application requirements.

By making the links in thermoplastic material and the articulation pins in stainless steel or metal, it is not possible to dispose of and recycle the chains as a whole, as it is necessary to disassembly them and separate the components (links and pins).

To meet special application requirements, curvilinear chains are known whose links and pins are made of polymeric material. For example, so-called 'anti-acid' chains are known to be used in chemically non-inert environments and must have features of resistance to chemical attack, and for such a purpose are made entirely (links and pins) of polymeric material, in particular polypropylene. A similar need arises if the chain must be opaque to X-rays, such as in the construction of metal detectors.

The curvilinear chains made entirely of polymeric of known types have plate bodies with a maximum thickness less than 5 mm and an articulation pin diameter equivalent to that of articulation pins made of steel (typically between 5 mm and 7 mm), so that they have limited working loads and are therefore penalised in application.

SUMMARY

The present disclosure overcomes the disadvantages of the prior art.

The present disclosure provides a curvilinear conveyor chain which can be effectively retained along curved sections of sliding guides without the use of mechanical stops of the retention tab type or magnetic components.

The present disclosure provides a curvilinear conveyor chain whose links have a low height and weight and are easy and inexpensive to manufacture and assemble.

The present disclosure also provides a curvilinear conveyor chain which allows easy disassembly without the need for complete removal of the chain from the guides, in the case of both one-way and multi-way conveyors, and which has improved stability, slidability and wear resistance features.

The present disclosure further makes a curvilinear conveyor chain which is dimensionally interchangeable with known chains and which requires curved, out-and-return guide segments which are of simple and inexpensive construction and which can be inserted in known conveyors without the need to replace the standard raceways provided for the straight sections.

The present disclosure also provides a curvilinear conveyor chain which can be supported along the return path in a simple and safe manner while safeguarding the integrity of the links and limiting the wear and tear thereof.

The present disclosure further provides a curvilinear conveyor chain which can be made of any material and which can be disposed of/recycled without the need to disassemble the components thereof.

The present disclosure makes a particularly simple and functional curvilinear conveyor chain, relative links and relative guide supports at a low cost.

These advantages according to the present disclosure are achieved by making a link of a curvilinear conveyor chain as set out in the independent claims.

These objects according to the present disclosure are achieved by making a curvilinear conveyor chain and a curved guide segment as set out in the claims.

Further features are provided in the dependent claims.

BRIEF DESCRIPTION OF THE DRAWINGS

The features and advantages of a curvilinear conveyor chain, relative links and relative curved guide supports according to the present disclosure will be more evident from the following illustrative and non-limiting description, referring to the accompanying drawings in which:

FIGS. 5 and 6 are sections according to the planes V-V and VI-VI of FIG. 4;

FIG. 7 is a transverse section of a conveyor comprising a possible embodiment of curvilinear conveyor chain and respective curved guide support;

FIG. 7A schematically shows a detail of a possible embodiment of a link of a curvilinear conveyor chain according to the present disclosure and which differs from that shown in FIG. 7 in, for example, the position of the longitudinal axis of the articulation pins;

FIGS. 13 to 17 show the link of FIGS. 11 and 12 in six orthogonal views;

FIGS. 18 to 24 are views like that of FIG. 7 of possible alternative embodiments of a conveyor comprising a curvilinear conveyor chain and the respective curved guide support.

DETAILED DESCRIPTION OF THE DRAWINGS

Figure 1:
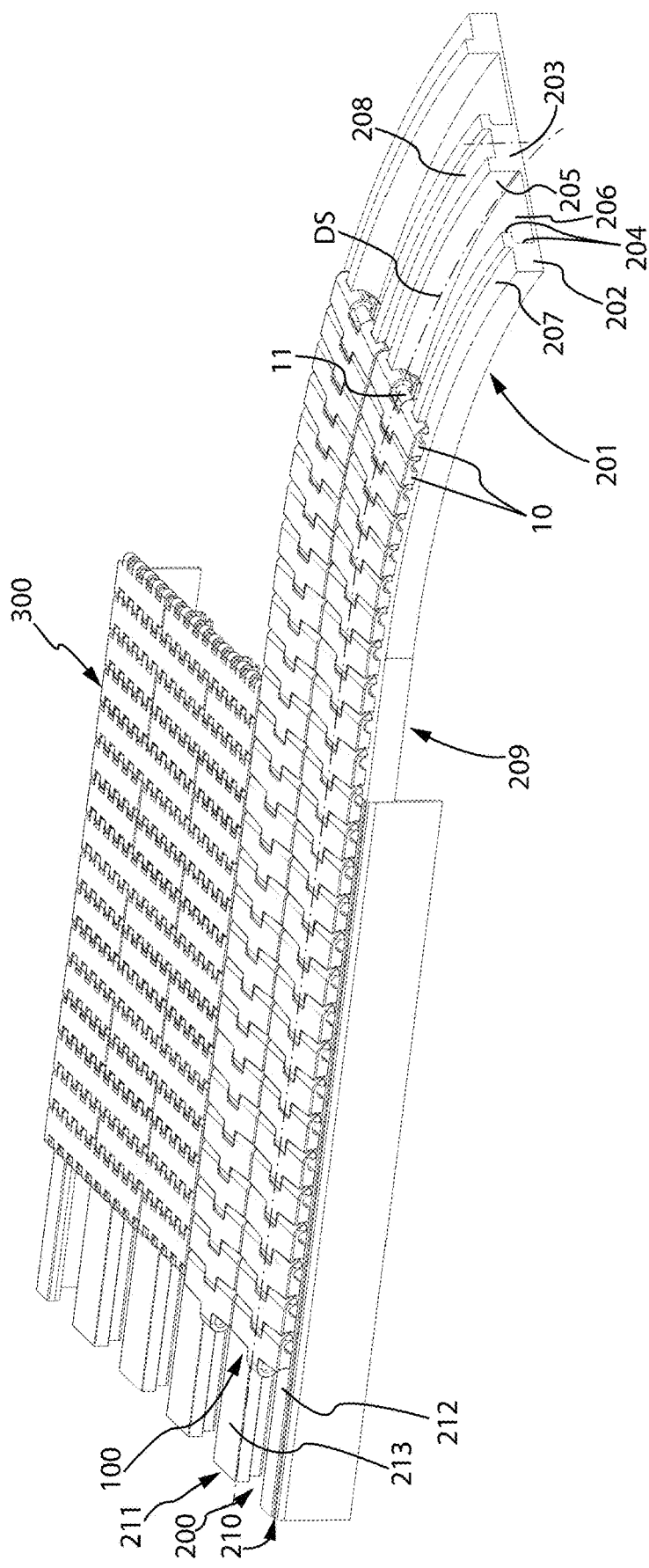
FIGS. 1 to 4 show a section of a multi-way conveyor comprising curvilinear conveyor chains according to a possible embodiment of the present disclosure in various axonometric and plan views from above.
Figure 2:
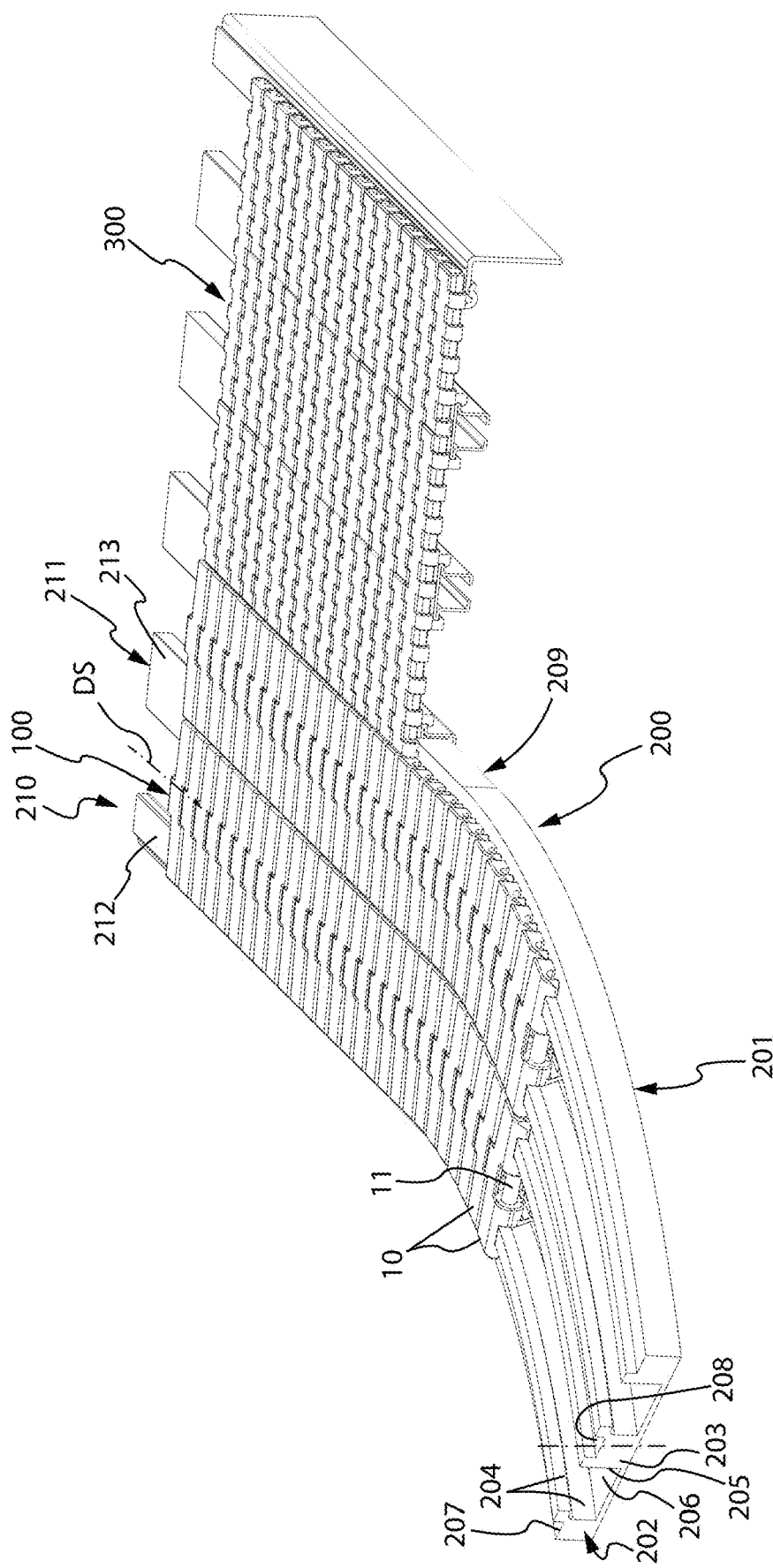
Figure 3:
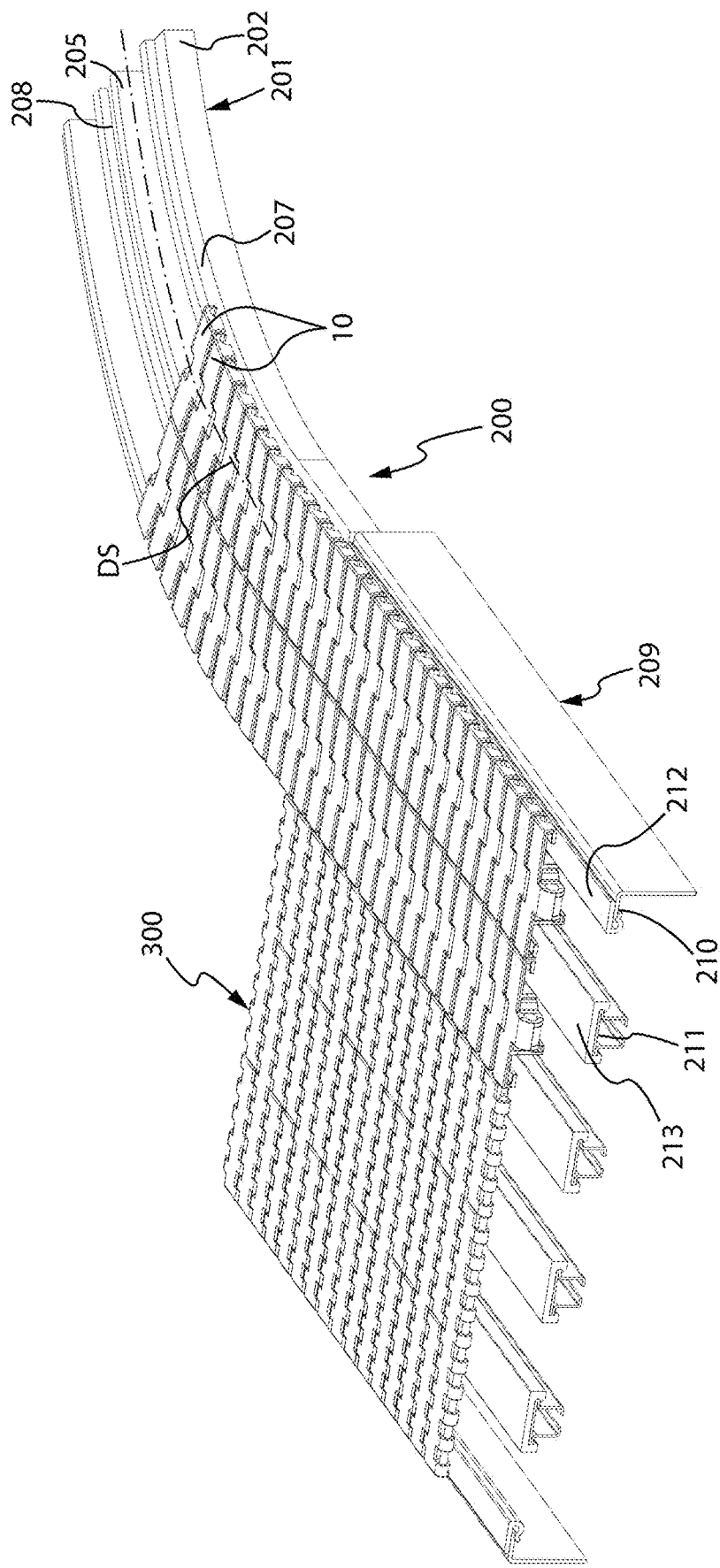
Figure 4:
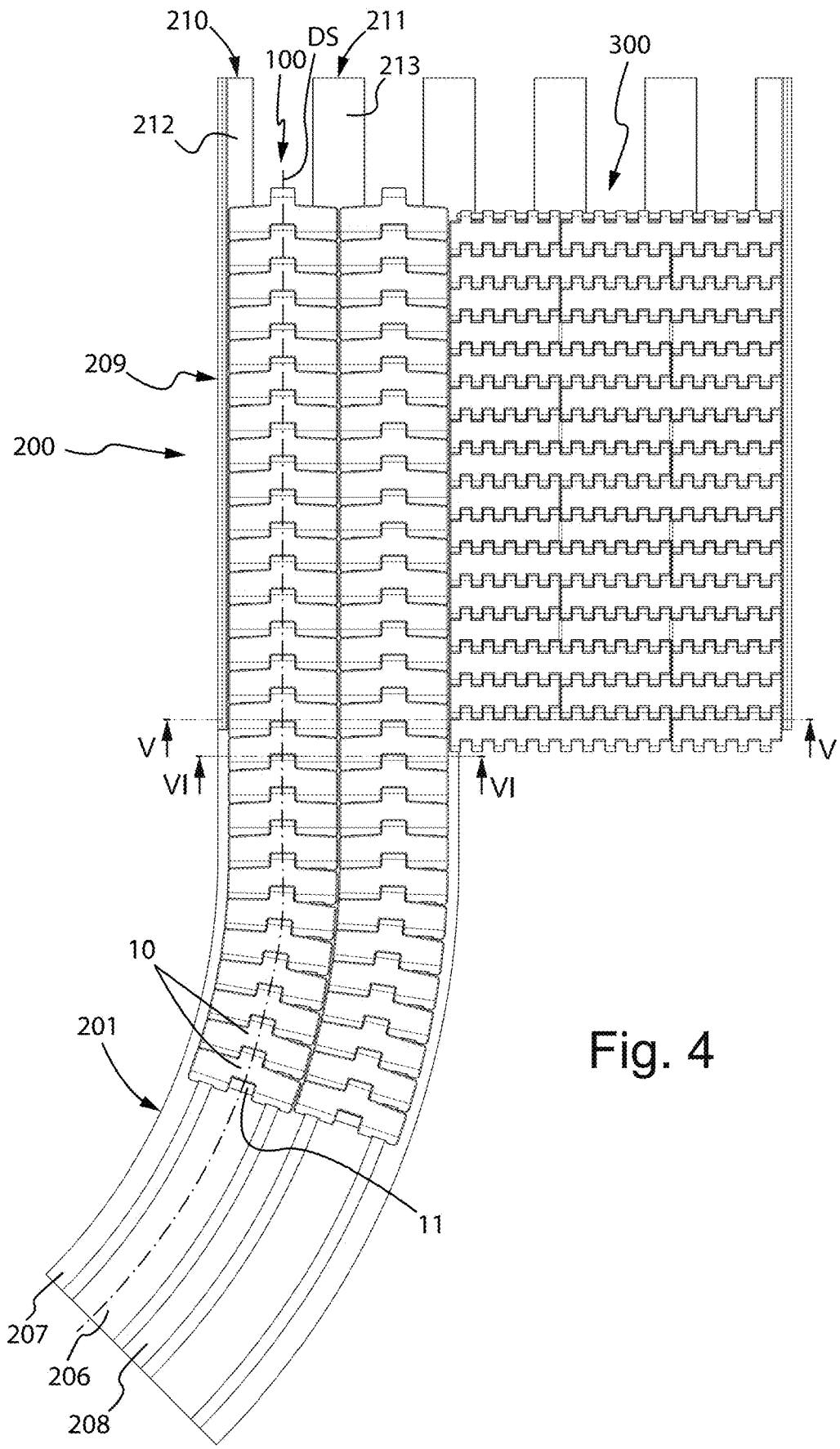
Figure 8:
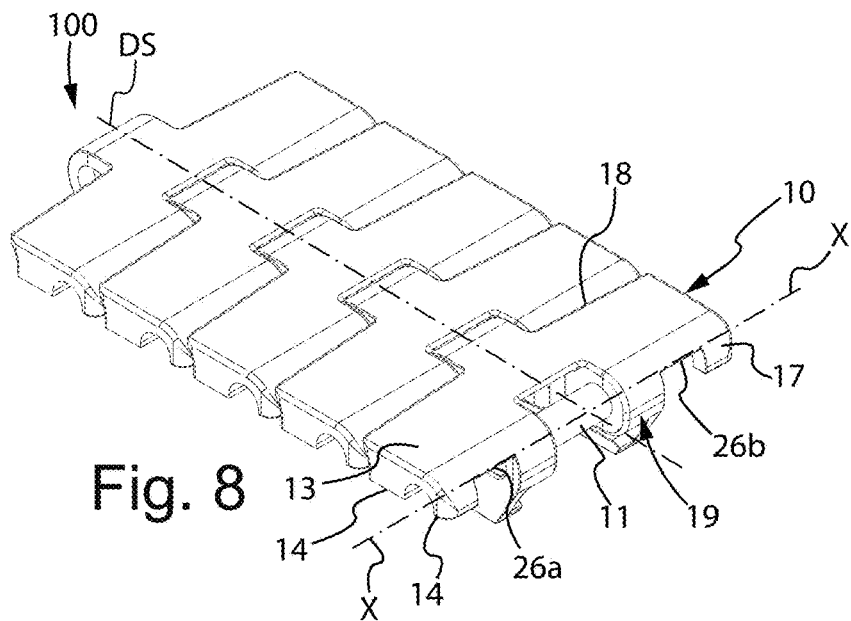
FIGS. 8, 9 and 10 show in axonometry from above, in axonometry from below and in plan view from below, respectively, a portion of a possible embodiment of a lateral-bending conveyor chain according to the present disclosure, a section of which is shown.
Figure 9:
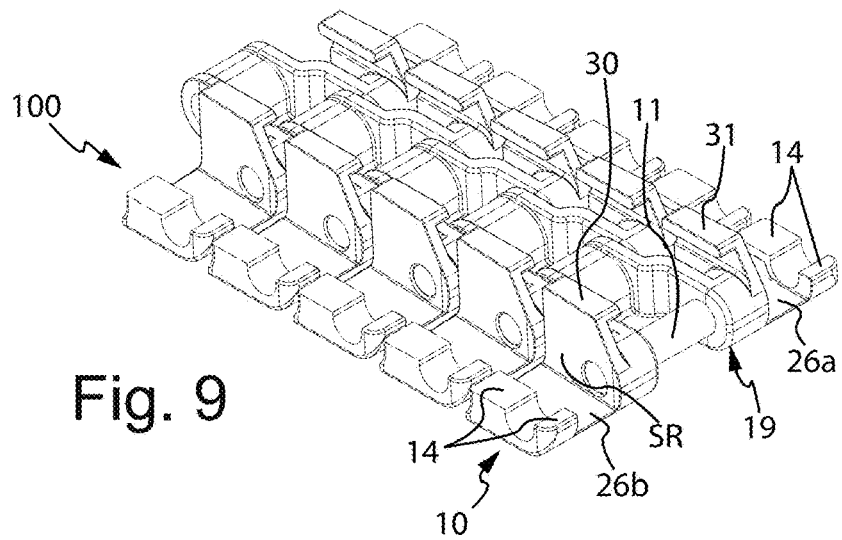
Figure 10:
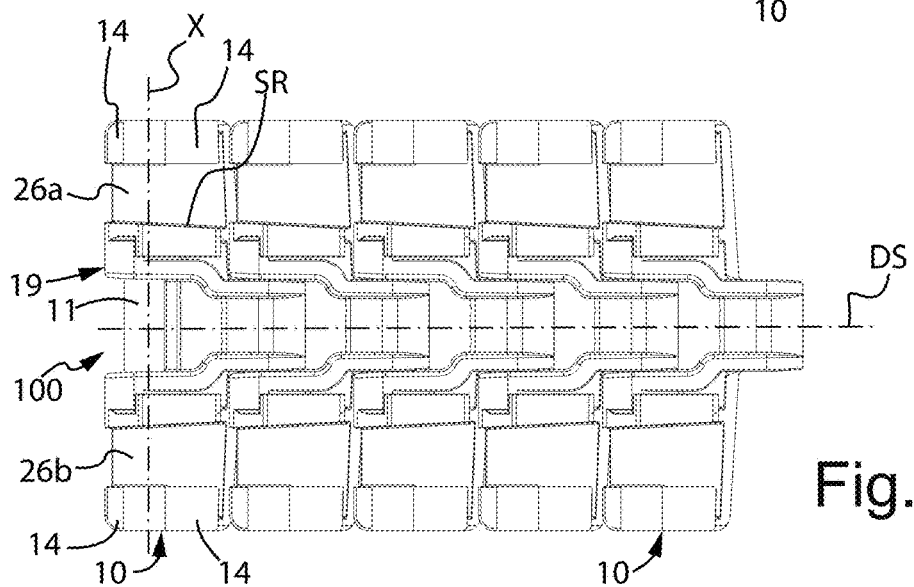
Figure 11:
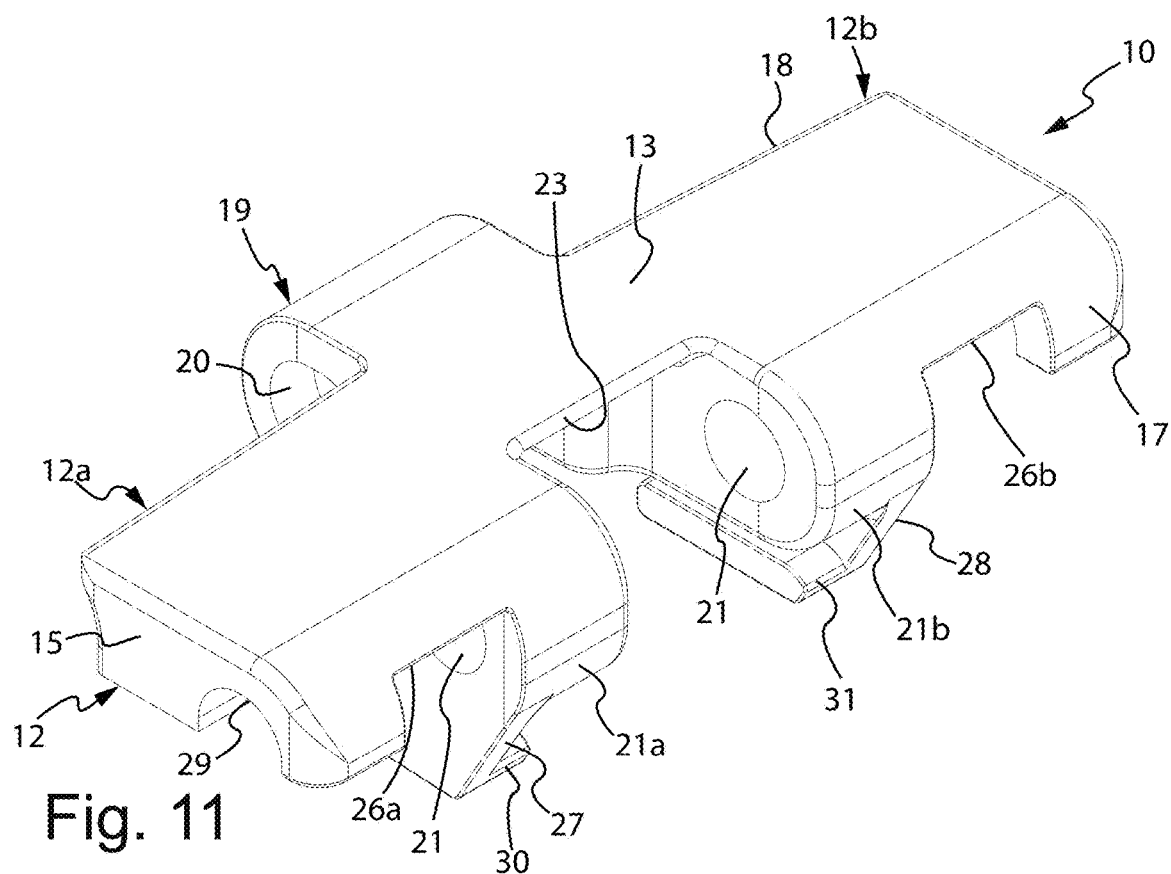
FIGS. 11 and 12 show a link of the chain from FIGS. 8-10 in axonometry from above and below, respectively.
Figure 12:
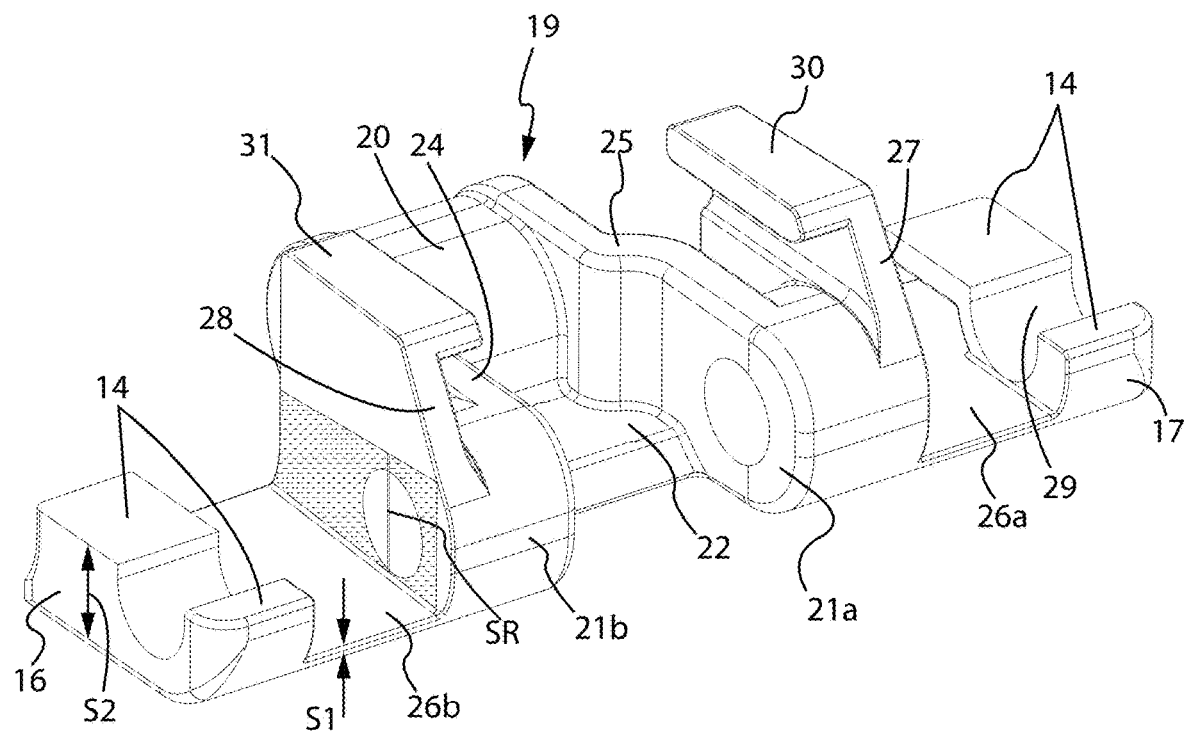

With reference to the accompanying drawings, a curvilinear conveyor chain according to the disclosure has been indicated with the reference number 100. The conveyor chain 100 (hereinafter 'chain 100') comprises a plurality of links 10 hinged to each other by articulation pins 11 (hereinafter 'pins 11').

The chain 100 is of the type which is adapted to run along a guide 200 comprising at least one curved section 201.

The curved section 201 comprises a pair of guide bodies 202, 203 spaced apart from each other and having respective lateral surfaces 204, 205 which are faced and parallel to each other and which delimit a curved path. A channel 206 remains defined between the lateral surfaces 204, 205, the longitudinal extension of which is arched.

One of the two lateral surfaces 204, 205 (lateral surface 204 in the figures) defines the inner side of the curved path, i.e., the one with the smaller radius of curvature. The other of the two lateral surfaces 204, 205 (lateral surface 205 in the figures) defines the outer side of the curved path, i.e., the one with the larger radius of curvature.

Each guide body 202, 203 has at the top a first flat surface 207, 208 which extends transversely to the respective lateral surface 204, 205.

The two guide bodies 202, 203 can be made in a single body generally having a 'U-like' shape, the arms of which consist of the two guide bodies 202, 203 between which the channel 206 remains defined. In the case of multi-way guides, it is also possible to make guide bodies 202, 203 of adjacent ways in a single body as shown in the accompanying FIGS. 1-6.

The guide 200 can further comprise at least one straight section 209 upstream and/or downstream of the curved section 201. The straight section 209 comprises, in a known manner, raceways 210, 211 with a straight extension which are arranged spaced apart and parallel to each other, thus forming a track. Each raceway 210, 211 has at the top a respective flat upper support surface 212, 213 on which the chain 100 rests and runs. The guides 210, 211 are aligned with the guide bodies 202, 203 so as to form a continuous guide, in which the first flat surface 207, 208 at the top of the guide bodies 202, 203 is substantially coplanar with the upper support surface 212, 213 of the raceways 210, 211.

FIGS. 1 to 6 show a portion of a so-called 'multi-way' conveyor, i.e., one in which there are several chains 100 side-by-side and next to which, in addition, conveyors 300 of other known type, e.g., belt conveyors, can run. In such a case, a respective guide 200 is provided for each chain 100. The guide bodies 202, 203 and/or raceways 210, 211 of adjoining guides 200 can, as is known, be obtained as a single body or otherwise form an assembly. For the sake of simplicity, in the accompanying figures, the components of a single chain 100 and the relative guide 200 have been numbered.

The chain 100 runs along the guide 200 dragged by a driving unit generally comprising gear wheels, at least one of which is motorised and not shown or described as being of a known type.

'Running direction' means the direction coinciding (along straight stretches) or tangent (along curved stretches) to the longitudinal extension axis of the guide 200 shown in the accompanying figures by the dashed line DS.

As is further known, the chain 100 is generally closed on itself in a loop. Generally, furthermore, the chain 100 is also closed on itself in a loop, forming an upper forward section and a lower return section. The chain 100, or at least its upper section, is intended for the transport of products. FIGS. 1 to 6 show the chain 100 or its upper section; FIGS. 18 to 24 show, in section along a curved section 201, a chain 100 closed on itself in a loop forming an upper forward section A and a lower return section B.

In the following description, terms such as 'lower' and 'upper', 'below' or 'above' refer to the chain 100, and in particular to the upper forward branch thereof, in operating conditions for the transport of products (not shown) resting thereon or on its upper forward section. As can be seen from FIG. 5 and following, each link 10 comprises a plate body 12 which has:

a first surface 13 defining a support surface adapted to support products to be transported, and below the first surface 13, a second surface 14 substantially flat and defining at least one plane resting and sliding on at least one respective upper support surface 212, 213 of a raceway 210, 211 of straight sections 209 of the guide 200.

The first surface 13 is the upper surface of the plate body 12.

The second surface 14 is not necessarily continuous and can comprise a plurality of discontinuous supports defining a common generic supporting and sliding plane, as for example shown in FIGS. 9, 10, 12 and 26.

Similarly, the first surface 13 can be shaped or finished differently from what is shown in the accompanying figures, for example, it can comprise lightenings, coatings, ribs, projections, rollers or other features known to the person skilled in the art.

The plate body 12 has, in plan, a generally rectangular shape and has a pair of end lateral surfaces 15, 16, a front edge 17 and a rear edge 18. The front edge 17 and/or the rear edge 18 are shaped to allow the lateral flexing of the chain 100 so that it can slide along curved paths; in particular, the rear edge 18, for example, can be chamfered, angled or tilted as seen in FIGS. 8, 10, 11 and 25 and in any case in a manner known to the person skilled in the art and, therefore, not further described.

Each link 10 then comprises an articulation portion 19 which extends below the first surface 13 of the plate body 12 and substantially in the middle thereof.

Advantageously, the articulation portion 19 and the plate body 12 are obtained in a single body.

Preferably, the articulation portion 19 and the plate body 12 are obtained in a single body obtained by moulding a polymeric (thermoplastic) material.

The second surface 14 is the lower surface of the plate body 12 outside the articulation portion 19.

The articulation portion 19 comprises at least one pair of housings 20, 21 transverse to the travel direction DS and each adapted to accommodate a respective pin 11 which articulates the link 10 with similar links 10, respectively preceding and following, to form the chain 100.

In the accompanying figures, the longitudinal axis of the pins 11 inserted in the housings 20, 21 has been indicated with the trace X-X; the longitudinal axes X-X are coplanar to a plane substantially parallel to the plane defined by the first surface 13 and extend along directions transverse to the travel direction DS.

The housings 20, 21, respectively a first housing 20 and a second housing 21, are obtained in parts of the articulation portion 19 and the plate body 12 which are complementary to each other and intended to engage with each other to allow hinging between two consecutive links 10, as shown for example in FIGS. 1-4, 8-12 and 25-26.

Each link 10 has at least one substantially flat reaction surface SR extending below the first surface 13 of the plate body 12 in a transverse plane, i.e., substantially orthogonal to less than a maximum angle of 7÷8°, to the longitudinal axes X-X of the pins 11. When the chain 100 runs along a curved section 201, the reaction surface SR is adapted to contact at least one portion of the lateral surface 204 of the guide body 202 defining the inner side of the curved path, generating a radial reaction force RR acting on the respective link 10 along a direction of action DRR extending above the longitudinal axes X-X of the pins 11 (see FIGS. 7 and 7A), along which pin axes, as is known, the radial force FR generated by the pulling action of the chain 100 along the curved section acts. In a limit condition, the direction of action DRR can at most coincide with the longitudinal axes X-X, but not lie below them with respect to the first surface 13.

It is evident to the person skilled in the art that the contact between the reaction surface SR and the lateral surface 204 of the guide body 202 defining the inner side of the curved path ideally occurs along a 'generating line' of the curved surface forming the inner side of the curved path itself. In reality, the contact is never punctual, but occurs along a surface which extends in height along such a 'generating line', a height which is essentially equal to the height $H_{SR}$, measured orthogonally to the first surface 13, of the reaction surface SR in contact with a corresponding portion of the lateral surface 204 defining the inner side of the curved path.

The radial reaction force RR acts along a direction DRR intersecting the reaction surface SR at a substantially median position with respect to the extension in height $H_{SR}$ of the reaction surface SR in contact with a corresponding portion of the lateral surface 204 defining the inner side of the curved path. The direction DRR along which the radial reaction force RR acts is substantially at the centreline (with respect to the extension in height $H_{SR}$) of the reaction surface SR in contact with a corresponding portion of the lateral surface 204 defining the inner side of the curved path.

The direction DRR is offset upwards (i.e., towards the first surface 13) at a generally non-zero distance S from the direction of the longitudinal axes X-X along which the radial force FR instead acts. The distance S defines the arm between the radial force FR acting on the pin 11 and the radial reaction force RR acting on the hinge.

The direction DRR is therefore closer to the first surface 13 with respect to the direction of the longitudinal axes X-X.

This thus generates a torque C which acts in the sense of retaining the link 10, and thus the chain 100, within the curved path, preventing it from rising at the outer side of the curve. In the accompanying figures, taking into account the position of the centre of curvature of the curved section 201, the torque C acts in a clockwise direction.

According to the present disclosure, the reaction surface SR comprises at least one section extending above the second surface 14 of the plate body 12.

That is, according to the present disclosure, the reaction surface SR comprises at least one section extending in height (height being measured orthogonally to the first surface 13 or to the transport plane defined thereon) above the second surface 14 of the plate body 12.

That is, the reaction surface SR comprises at least one section extending in height above the second surface 14 of the plate body 12 which is intended to rest and slide on the upper support surface 212, 213 of straight sections 209 of the guide 200.

The reaction surface SR at least partially 'penetrates' the plate body 12 and in particular the second surface 14 thereof; that is, the reaction surface SR extends for at least a stretch section the thickness of the plate body 12, 'intersecting' it.

Advantageously, the reaction surface SR extends for at least a section of its extension in height $H_{SR}$ to contact the lateral surface 204 defining the inner side of the curve above the second surface 14 of the plate body 12 so that the distance S between the direction DRR and the longitudinal axes X-X is non-zero.

In a possible embodiment (FIG. 7), the longitudinal axes of the housings 20, 21—and thus, barring any known coupling clearances, the longitudinal axes X-X of the pins 11 inserted therein—extend along directions parallel to each other and coplanar to a plane parallel to the second surface 14 of the plate body 12 and which is located between the first surface 13 and the second surface 14 thereof.

That is, the housings 20, 21 are arranged so that the longitudinal axes X-X of the pins 11 inserted therein lie in a plane parallel to the second surface 14 of the plate body 12 and arranged thereabove by a non-zero distance (and below the first surface 13). Since the second surface 14 of the plate body 12 is intended to rest and slide on the upper support surface 212, 213 of the raceways 210, 211 of straight sections 209 of the guide 200, in use the longitudinal axes X-X of the pins 11 are above the upper support surface 212, 213 of the raceways 210, 211.

Alternatively, the longitudinal axes X-X can extend in a plane which is below the second surface 14 (FIG. 7A), as long as the condition is satisfied where the reaction surface SR extends for at least a section of its extension in height $H_{SR}$ above and interpenetrating the second surface 14, and has an extension in height $H_{SR}$ such that, in contact with the lateral surface 204 defining the inner side of the curved path, its centre line, along which the radial reaction force RR acts approximately, is located above (i. e., nearer to the first surface 13) the longitudinal axes X-X, being offset upwards with respect thereto by a non-null distance S or at most a zero distance (S>0).

In FIGS. 7 and 7A, the behaviour of possible embodiments of a chain 100 according to the present disclosure at a curved section 201 has been diagrammed. The same is true for the alternative embodiments shown and described here.

The arrow FR indicates the radial force acting along the longitudinal axis X-X of the pins 11 and which is generated as a result of the pulling action of the chain 100 when it runs along a curved section 201. The radial force FR tends to force the chain 100 towards the inner side of the curved section 201 generating a tilting torque which tends to lift the chain 100 at the outer side of the curved section.

The radial force FR acts in the pushing direction of the chain 100 towards the inner side of the curved section 201, bringing the reaction surface SR of each link 10 into sliding contact with the lateral surface 204 of the guide body 202 on the inner side of the curved section 201.

In the contact between the reaction surface SR and the lateral surface 204, a radial reaction force indicated by the arrow RR is generated, which acts in the opposite direction to the radial force FR. The radial reaction force RR acts along a direction DRR which is essentially in the median position of the reaction surface SR, i.e., essentially in the middle of the extension in height $H_{SR}$ of the reaction surface SR in contact with the lateral surface 204 which defines the inner side of the curved path.

In a manner immediately comprehensible to the person skilled in the art, the reaction surface SR and, in particular, its height $H_{SR}$ is dimensioned so that the direction of action DRR of the reaction force RR is at a higher height with respect to the direction of action of the radial force FR, i.e., at a higher height with respect to the longitudinal axes X-X of the pins 11. Thereby, a torque C is generated which acts on the link 10, retaining it within the curved section 201 and preventing it, in particular, from lifting along the outer side thereof.

As seen above, according to the present disclosure the reaction surface SR extends for at least a section of its extension in height $H_{SR}$ above the second surface 14 of the plate body 12, interpenetrating it.

This makes it possible to reduce the overall height of each link 10 with respect to the known type of links—and, in particular, with respect to the links such as those known from EP0527584B1—and, therefore, also the relative weight, with consequent advantages not only in terms of the use and cost of the materials required to make the links 10, but also in terms of reducing the power used to drag the conveyor chain 100 obtained therewith.

Reducing the overall height of the links 10 also makes it possible to:
  reduce the opening between successive links when engaging the gear wheels, which increases the safe use of the chain 100, reducing the risk of accidental crushing of the fingers of operators operating or maintaining the conveyor;
  reduce the so-called 'chordal effect';
  reduce the overall height of the guides 200 with a consequent reduction in the overall dimensions and production costs of the guides 200 themselves.

Depending on the various possible embodiments of the link 10, which will be described below and which differ from each other in particular in terms of whether or not elements are provided adapted to support the conveyor chain 100 along the return path, the overall height of the link 10 according to the present disclosure varies from 12 mm to 25 mm.

It should be noted that the link 10 is retained in place along the curved sections 201 without any need for the use of further expedients such as tabs, inclined surfaces ('bevels') or components adapted to react to magnetic fields.

This allows to disassemble the conveyor chain 100, for example for maintenance or replacement, simply lifting it from the guide 200 even at the curved sections 201 thereof, without the need to disassemble the chain and/or the guide.

Moreover, as will also be seen below, as there is no need to use materials reacting to magnetic fields, both the link 10 and the pins 11 can be made of polymeric materials.

In particular, the link 10 can be made of a first thermoplastic material and the pins 11 can be made of a second thermoplastic material.

In a preferred embodiment, the first thermoplastic material and the second thermoplastic material belong to the same polymeric family and, for example, are chosen from the acetal resin group (POM polyoxymethylene).

Advantageously, the first thermoplastic material and the second thermoplastic material have different mechanical and/or physical features; for example, they may have a different wear resistance and/or a different coefficient of friction.

In particular, the link 10 can be made of lubricated acetal resin with low friction coefficient features, while the pins 11 can be made of acetal resin with high mechanical strength features. The opposite is not excluded.

By making the links 10 and pins 11 of homologous, related or compatible polymeric materials, meaning polymeric materials which, belonging to the same polymeric family, can be disposed of/recycled together or in a single supply chain, it is possible to dispose of/recycle the chain 100 in its entirety, without the need to disassemble its components and to differentiate its disposal and/or recycling.

As shown in the accompanying figures, in one possible embodiment, the plate body 12 and the articulation portion 19 are made in a single body.

With reference to the accompanying figures, the articulation portion 19 comprises:
  a first housing 20 consisting of a substantially cylindrical element which is crossed by an axial hole and which projects behind the rear edge 18 of the plate body 12 and below its first surface 13, a second housing 21 which consists of a pair of eyelets 21a, 21b which are obtained near the front edge 17 of the plate body 12 and which protrude below its first surface 13; each eyelet 21a, 21b is crossed by a respective axial hole and the holes of the two eyelets 21a, 21b are coaxial to each other.

The two eyelets 21a, 21b are parallel to each other and spaced so as to form a space 22 therebetween adapted to accommodate the first housing 20 of a similar link 10.

In the space 22, the first slot 20 of an adjacent link 10 can be inserted so that the axial hole of the latter is aligned with the axial holes of the two eyelets 21a, 21b to receive a pin 11 connecting two successive links 10 to each other.

In order to allow for a relative movement of the links 10 therebetween, the plate body 12 has an opening 23 obtained at the space 22.

In the embodiment shown, the hinge portion 19 then comprises a pair of shaped ribs 24, 25 which extend below the first surface 13 of the plate body 12 and connect the axial ends of the first housing 20 to the two eyelets 21a, 21b.

Figure 25:
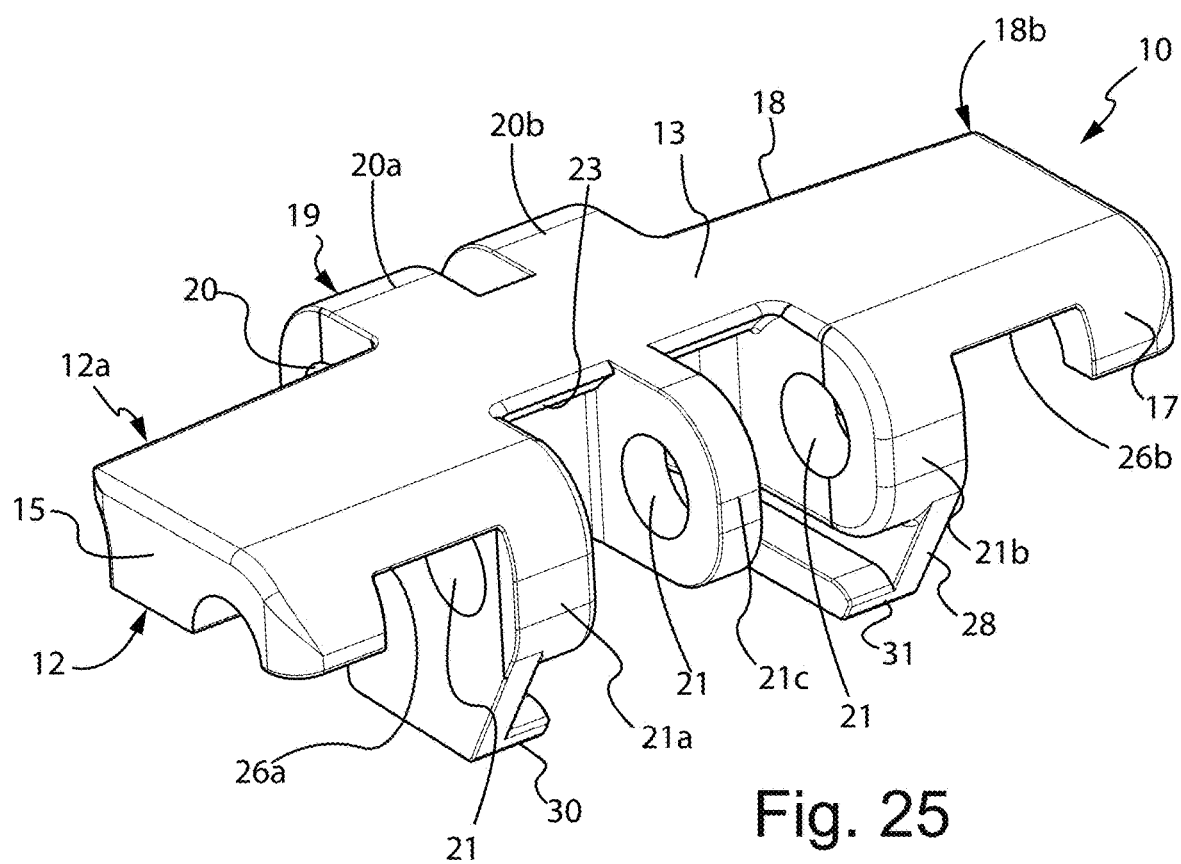
FIGS. 25 and 26 are views like those of FIGS. 8 and 9 of a further alternative embodiment of a link of a curvilinear conveyor chain according to the present disclosure.
Figure 26:
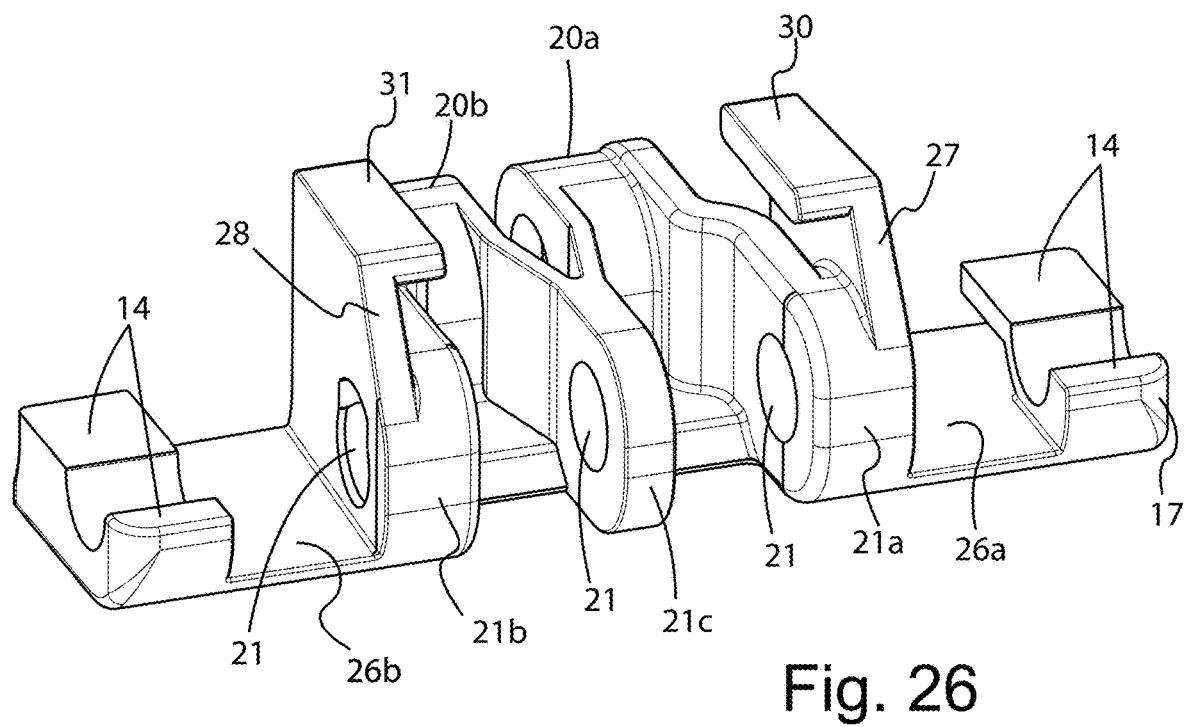

As shown in FIGS. 25 and 26, in a possible alternative embodiment, the first housing 20, the one defined at the rear edge 18, is in turn formed by a pair of eyelets 20a, 20b and the second housing 21, the one defined at the front edge 17, by three corresponding eyelets 21a, 21b and 21c, one being housed in spaces delimited by the others and vice versa. The latter solution, which, for the same load, makes it possible to limit the elongation of the chain due to flexural deformation of the pin 11 with respect to the previously described solution. Such a conformation of the housings 20, 21 can be adopted in all the embodiments shown in the accompanying figures.

The plate body 12 comprises below the first surface 13 at least one substantially straight groove 26a, 26b extending substantially parallel to the travel direction DS and whose innermost side at least partially defines the reaction surface SR.

The plate body 12 comprises a pair of grooves 26a, 26b arranged symmetrically with respect to a median plane orthogonal to the longitudinal axes X-X.

Advantageously, the reaction surface SR is obtained on a respective side of the articulation portion 19, which thus forms the innermost side of the respective groove 26a, 26b.

At the opposite sides of the articulation portion 19 is a respective sidewall 27, 28 which extends below the first surface 13 of the plate body 12.

The sidewalls 27, 28 are flat and extend in planes transverse or orthogonal to the longitudinal axes X-X.

In the embodiment shown in the accompanying figures (FIGS. 10 and 12), the sidewalls 27, 28 form a non-zero angle with a median plane orthogonal to the longitudinal axes X-X; the sidewalls 27, 28 are slightly tilted towards each other converging towards the rear edge 18.

The sidewalls 27, 28 are crossed by a respective hole aligned with one of the two housings 20, 21 to allow the insertion of the pin 11 in the latter; in the embodiment shown, the sidewalls 27, 28 are crossed by a respective hole coaxial to that of the eyelets 21a, 21b.

The reaction surface SR is defined at the outer surface of the sidewall 27, 28 on the inner side of the curved section 201. The sidewalls 27, 28 can form the sides of the articulation portion 19 and their outer surface forms the innermost side of the respective groove 26a, 26b, forming the reaction surface SR.

The articulation portion 19 and/or the sidewalls 27,28 can extend for a section below the second surface 14 and which, in use, is received in the channel 206.

The second surface 14 is interrupted by at least one arcuate recess 29 aligned with one of the two housings 20, 21 to allow the insertion of the pin 11 in the latter. In the embodiment shown in the accompanying figures, the recess 29 is aligned with the second housing 21, i.e., with the eyelets 21a, 21b.

Altogether, the plate body 12 comprises a pair of wings 12a, 12b extending from the opposite sides of the articulation portion 19, each of which has:
 a first portion having a first thickness S1 and
 a second portion having a second thickness S2, in which the second thickness S2 is greater than the first thickness S1.

The second surface 14 of the plate body 12 consists of the lower surface of the wings 12a, 12b at their second thickness portion equal to the second thickness S2.

The reaction surface SR is defined at the first portion of the two wings 12a, 12b which has a thickness equal to the first thickness S1.

In a preferred embodiment, shown in the accompanying figures, the first and the second portion of each wing follow each other starting from the respective side of the articulation portion 19.

In such a case, the first portion of each of the two wings 12a, 12b is laterally delimited by the second portion of the respective wing 12a, 12b and by the corresponding side of the articulation portion 19 or by the respective sidewall 27, 28, thus forming a respective groove 26a, 26b.

As diagrammed in FIG. 7A and as explained above, for a stabilising torque C to be generated, the condition according to which S>0 must hold, from which it follows that:

$$H_p \geq S_1 + (H_{SR}/2),$$

where:
 $H_{SR}$ is the height, measured orthogonally to the first surface 13, of the reaction surface SR intended to contact, i.e., in contact, with the lateral surface 204 delimiting the inner side of the curved path (i.e., hinge-curve contact length);
 Hp is the distance measured orthogonally to the first surface 13 between the first surface 13 itself and the longitudinal axes X-X of the pins 11, along whose direction the radial force FR acts;
 S1 is the thickness (first thickness) which the plate body 12 has outside the articulation portion 19 and at the portion thereof 'interpenetrated' by the reaction surface SR;
 S is the distance, measured orthogonally to the first surface 13, between the centreline of the extension in height $H_{SR}$ (centreline along which the radial reaction force RR acts which is generated in the contact between the reaction surface SR and the lateral surface 204 delimiting the inner side of the curved path) and the longitudinal axis X-X of each pin 11 (along which the radial reaction force FR acts).

In which, moreover, the first thickness S1 is less than the thickness S2 (second thickness) which the plate body 12 has externally to the articulation portion 19 at the portion thereof defining the second surface 14 adapted to rest on and slide along the upper support surface 212, 213 of raceways 210, 211 defining straight sections 209 of the guide 200 (S1<S2).

Preferably, S1 is the minimum thickness which the plate body 12 has externally to the articulation portion 19. Advantageously, the first thickness S1 is less than or equal to half of the second thickness S2 (S1<S2/2).

It should be noted that the expression 'externally to the articulation portion 19' is used to indicate portions of the plate 12 body which do not coincide with that at which the articulation portion 19 is present.

The first thickness S1 is determined as a function of the minimum mechanical strength of the plate body 12.

The second thickness S2 is also determined as a function of the flanking of chain 100 with other chains or conveyors.

For example, the first thickness S1 can vary between 3 mm and 5 mm and the second thickness S2 is greater than 5 mm.

Advantageously, the second thickness S2 is greater than twice the first thickness S1 or regardless at least 5 mm greater than the first thickness S1. With reference to the above example (3 mm≤S1≤5 mm), the second thickness S2 can vary between 8.7 mm and 12.7 mm (8.7 mm≤S2≤12.7 mm), With reference to the embodiment shown in the accompanying figures, the plate body 12 has, externally to the articulation portion 19, a maximum thickness equal to that of the second portion of its wings 12a, 12b (second thickness S2) and a minimum thickness equal to that of the first portion of its wings 12a, 12b (first thickness S1).

The reaction surface SR has a height $H_{SR}$ measured orthogonally to the plane defined by the first surface 13 of the plate body 12 equal to or greater than 7 mm, preferably greater than or equal to 9 mm.

Compatibly with the mechanical strength of the plate body 12 at the portion thereof having a thickness equal to the first thickness S1 (minimum thickness) and with the same height $H_{SR}$ of the reaction surface SR in contact with the lateral surface 204 delimiting the inner side of the curved path, the overall height of the link 10 can be reduced with respect to that of the known links by a dimension equal to the difference between the second thickness S2 and the first thickness S1 (S2−S1).

With reference to the examples given above, where 3 mm≤S1≤5 mm and 8.7 mm≤S2≤12.7 mm, for the same $H_{SR}$ (e.g., 9 mm), a reduction in height (S2-S1) of between 5.7 mm and 9.7 mm is obtained.

The pins 11 have a diameter greater than 5 mm, preferably between 7 mm and 10 mm and even more preferably 8 mm.

The link 10 can comprise at least one pair of teeth 30, 31 projecting in a direction transverse to the travel direction DS and which are defined, facing or opposite each other, below the first surface 13 of the plate body 12.

Such teeth 30, 31, if present, are intended to slidingly engage with a complementary return support 214 of the chain 100 along the return path.

The teeth 30, 31 do not interact with the guide 200 along the forward path. In particular, the teeth 30, 31 do not interact with corresponding elements obtained in the guide bodies 202, 203 defining the curved section 201 of the forward path, for example to make an obstacle to the lifting of the conveyor chain 100 (i.e., the guide bodies 202, 203 lack elements adapted to interact with the teeth 30, 31). The teeth 30, 31 only serve to support the conveyor chain 100 along the return path.

In such a case, as is evident to the person skilled in the art, non-uniform wear is avoided of the first surface 13 of the plate body 12 due to the sliding thereof along containment plates which, in the absence of the teeth 30, 31 (see FIG. 24), must necessarily be provided along the return path.

The teeth 30, 31 can be obtained at the articulation portion 19 below the second surface 14 of the plate body 12.

In the embodiment shown in FIGS. 7-12, they are obtained at the lower end of the plates 27, 28 which extend below the second surface 14 to be accommodated in the channel 206.

Alternatively, the teeth 30, 31 can be obtained in the thickness of the plate body 12, for example, they can be obtained in an overhang from the outermost side which delimits each groove 26a, 26b (FIG. 21), facing each other.

The present disclosure provides a curved guide segment for a curvilinear chain 100 as described overall above. The curved guide segment or curved section 201 comprises at least one pair of guide bodies 202, 203 spaced apart from each other and having respective lateral surfaces 204, 205 facing each other and parallel to each other which delimit a curved path, in which one of such lateral surfaces 204, 205 defines the inner side of the curved path and the other of said lateral surfaces 204, 205 defines the outer side of the curved path.

The guide body 202, 203 whose lateral surface 204, 205 defines the inner side of the curved path comprises at the top:
  a first flat surface 207, 208 on which, in use, the second surface 14 of the plate bodies 12 of link 10 superimposes and
  a longitudinal projection 215 protruding from the first flat surface 207, 208 thereof and forming with such a first flat surface 207, 208 a first step 216, in which the side of the projection 215 facing the lateral surface 204, 205 defining the outer side of the curved path and which, in the accompanying figures is opposite the first step 216, forms at least in part the portion of the lateral surface 204, 205 adapted to contact the reaction surface SR of the links 10.

In a preferred embodiment, shown for example in FIGS. 6, 7, 19, 20, 23, the side of the projection 215 facing the lateral surface 204, 205 defining the outer side of the curved path constitutes (all and only) the portion of the lateral surface 204, 205 adapted to contact the reaction surface SR of the links 10. In the embodiment shown in the accompanying figures, in such a case the projection 215 forms a second step 217 (undercut) at the lateral surface 204, 205.

Such a solution avoids abnormal contact and wear between the reaction surface SR and the corresponding portion of the lateral surface 204, 205.

In an alternative embodiment, as for example shown in FIGS. 18, 21, 22 and 24, the side of the projection 215 facing the lateral surface 204, 205 defining the outer side of the curved path is coplanar with the remaining portion of the lateral surface 204, 205.

The projection 215 is accommodated or couples with clearance in the respective groove 26a, 26b of the plate body 12 located on the inner side of the curved section 201.

The guide body 202, 203 whose lateral surface 204, 205 forms the outer side of the curved path comprises at its top a first flat surface 207, 208 on which, in use, the second surface 14 of the plate bodies 12 of the links 10 is superimposed.

In such a case, the first flat surface 207, 208 can be totally flat (FIGS. 18, 21, 22, 24) or it can have a rib 218 projecting thereabove (FIGS. 6, 7, 19, 20, 23) and serving as an external support for the plate body 12.

The rib 218 is adapted to be housed or accommodated with clearance in the groove 26a, 26b of the plate body 12 located on the outer side of the curved section 201. The lateral surface 204, 205 of the guide body 202, 203 on the outer side of the curved section 201 can lack steps or projections.

The two guide bodies 202, 203 can be made in a substantially U-like shaped body and guide bodies 202, 203 of side-by-side ways can be made in a single body (FIGS. 1-6).

Between the two guide bodies 202, 203 the channel 206 in which the articulation portions 19 are accommodated remains defined.

The curved guide segment (curved section 201) can comprise along the return path B of the chain 100 a return support 214 extending parallel to and below the curved path and having along its longitudinal extension at least one pair of transverse fins 214a, 214b on which pairs of teeth 30, 31 protruding transversely from each link 10 are slidingly supported to slidingly support the chain 100 along the return path.

This is shown, for example, in FIGS. 7, 18-23, in which the shape of the return support 214 varies as a function of the arrangement and position of the teeth 30, 31 which can be facing each other (FIGS. 7, 18, 19, 20, 21) or opposite each other (FIGS. 22, 23), arranged below (FIGS. 7, 18-20, 22 and 23) or above (FIG. 21) the second surface 14 of the plate body 12. Alternatively, if the links 10 are not provided with pairs of teeth 30, 31, return guide bodies 202', 203' (also made in a single U-shaped body) copying the guide bodies 202, 203 are provided along the return path and below which a plate 219 is arranged to contain and support the chain 100. However, such a solution has, with respect to the others, the disadvantage of generating wear on the first surface 13 of the plate body 12.

FIGS. 1 to 4 show a section of a conveyor comprising one or more chains 100 according to the present disclosure side by side with other conveyors 300.

Each conveyor chain 100 runs along a guide 200 having at least one straight section 209 and at least one curved section 201 as described above.

It should be noted that the second surface 14 of the plate bodies 12 is intended to rest on and run along the upper support surfaces 212, 213 of the raceways 210, 211 forming the straight section 209.

The guide bodies 202, 203 forming the curved section 201 have at the top a first flat surface 207, 208 substantially coplanar with the upper support surfaces 212, 214.

The guide body 202, 203 on the inner side of the curved section 201 has the respective lateral surface 204, 205 extending for at least one section, which is formed by the inner side of the projection 215, above the respective first flat surface 207, 208 to contact the reaction surface SR obtained in the links 10, in the thickness of the plate body 12.

The chain 100 can therefore be used even in existing plants, without the need to replace the raceways 210, 211 or regardless the guides of the existing straight path sections or use different ones.

It is then possible to place the chain 100 side by side with similar chains or 300 conveyor belts of different types without creating differences in height between the product support surfaces.

The embodiment in FIG. 18 shows a chain 100 whose links 10 have pairs of teeth 30, 31 facing each other and obtained in projections which extend below the articulation portion 19. In it, the guide body 202 on the inner side of the curved section has the lateral surface 204 free of steps or undercuts (the projection 15 is not protruding towards the middle of the channel 206).

The embodiment shown in FIG. 19 shows a chain 100 whose links 10 have pairs of teeth 30, 31 facing each other and obtained in projections which extend below the articulation portion 19. It can also be seen that the reaction surface SR is formed by the sides of the articulation portion 19 which are recessed with respect to the projections provided by the teeth 30, 31. The guide body 202 on the inner side of the curved section has the lateral surface 204 shaped with at least one step (second step 217) or undercuts (the projection 15 is protruding towards the middle of the channel 206).

Figure 20:
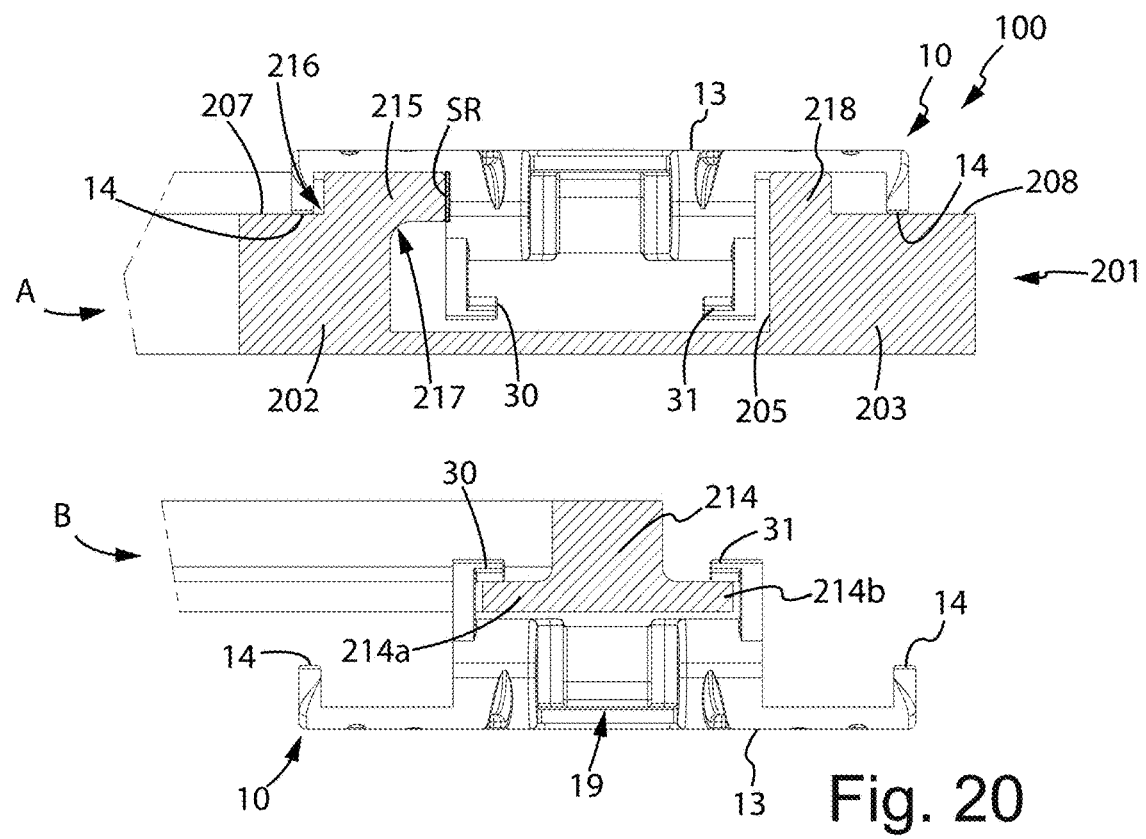

The embodiment shown in FIG. 20 differs from that of FIG. 19 in the sizing of the second surface 14, the grooves 26a, 26b and the relative projections 215 and the shape and arrangement of the teeth 30, 31.

Figure 21:
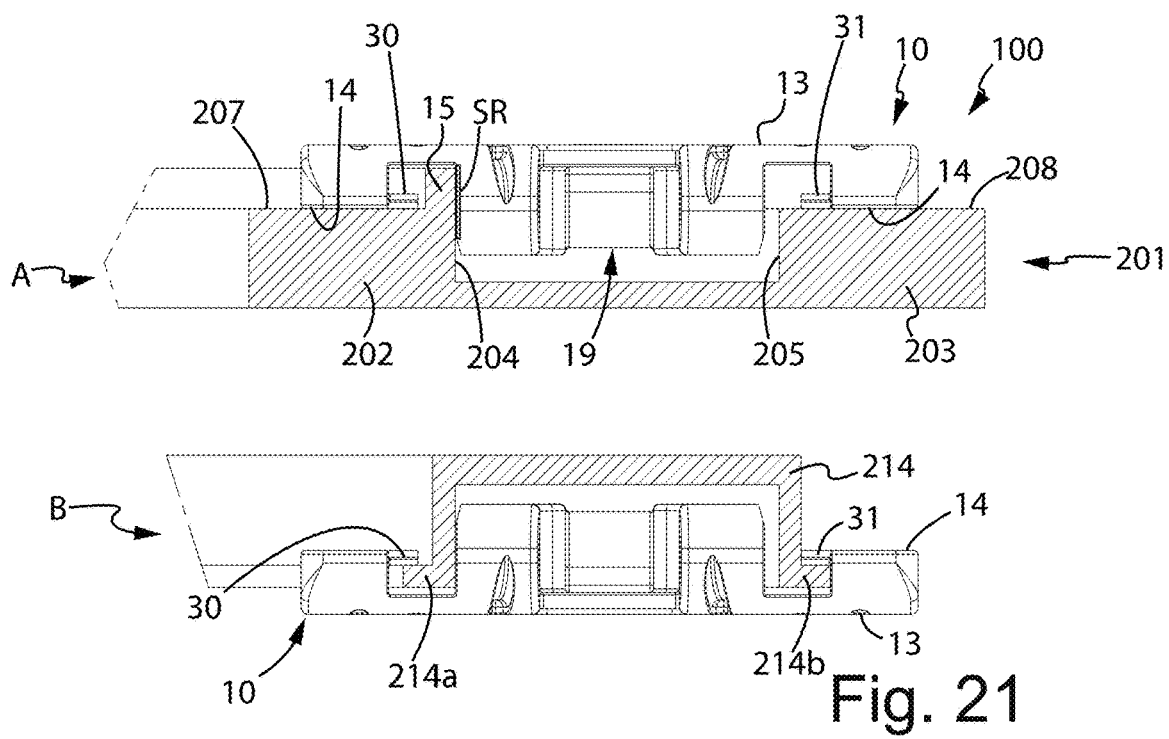

The embodiment shown in FIG. 21 differs from that of FIG. 18, apart from the dimensions of the grooves 26a, 26b, in the arrangement of the teeth 30, 31 which are obtained by facing each other above the second surface 14 at the outermost sides of the grooves 26a, 26b, changing the shape of the return support 214.

Figure 22:
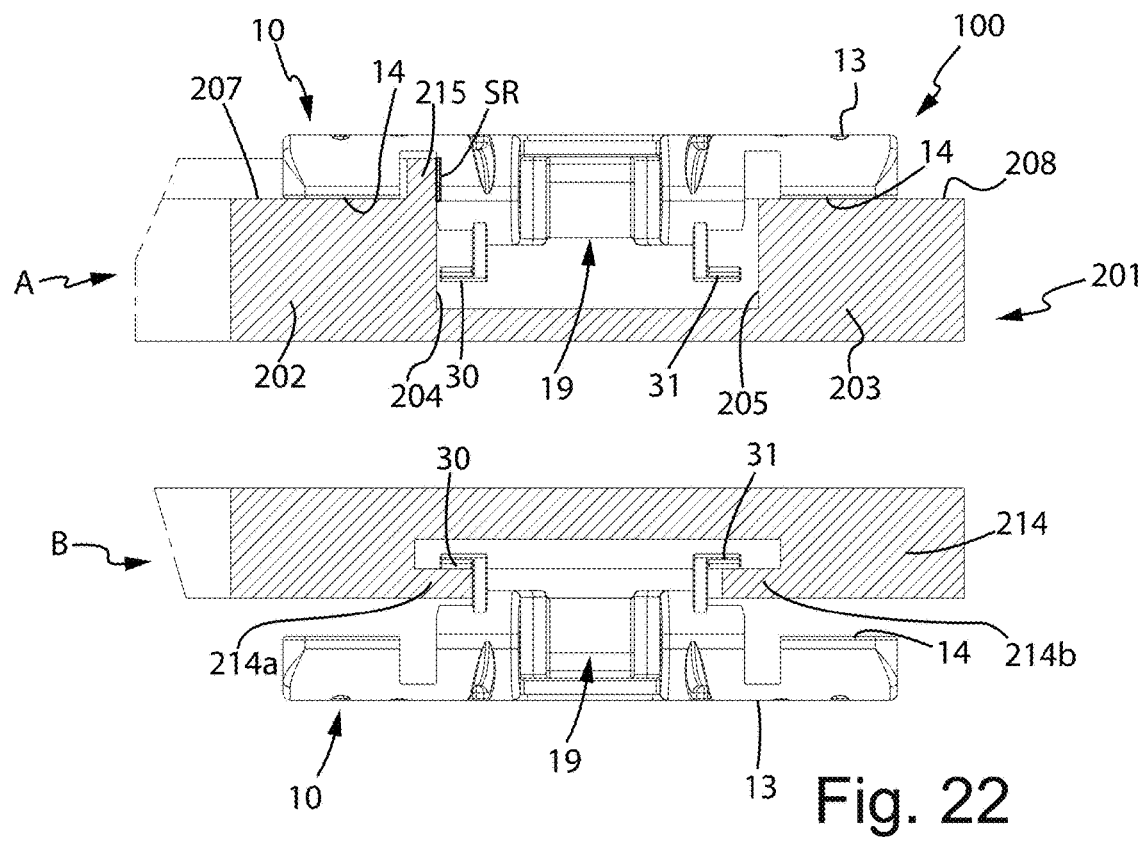

The embodiment shown in FIG. 22 shows a conveyor chain 100 whose links 10 have pairs of teeth 30, 31 opposite each other and obtained in projections which extend below the articulation portion 19. In it, the guide body 202 on the inner side of the curved section has the lateral surface 204 free of steps or undercuts (the projection 15 is not protruding towards the middle of the channel 206) and the teeth 30, 31 do not protrude beyond the sides of the articulation portion 19. The return support 214 is shaped so as to have a T-shaped groove forming fins 214a, 214b on which the teeth 30, 31 slidingly rest.

Figure 23:
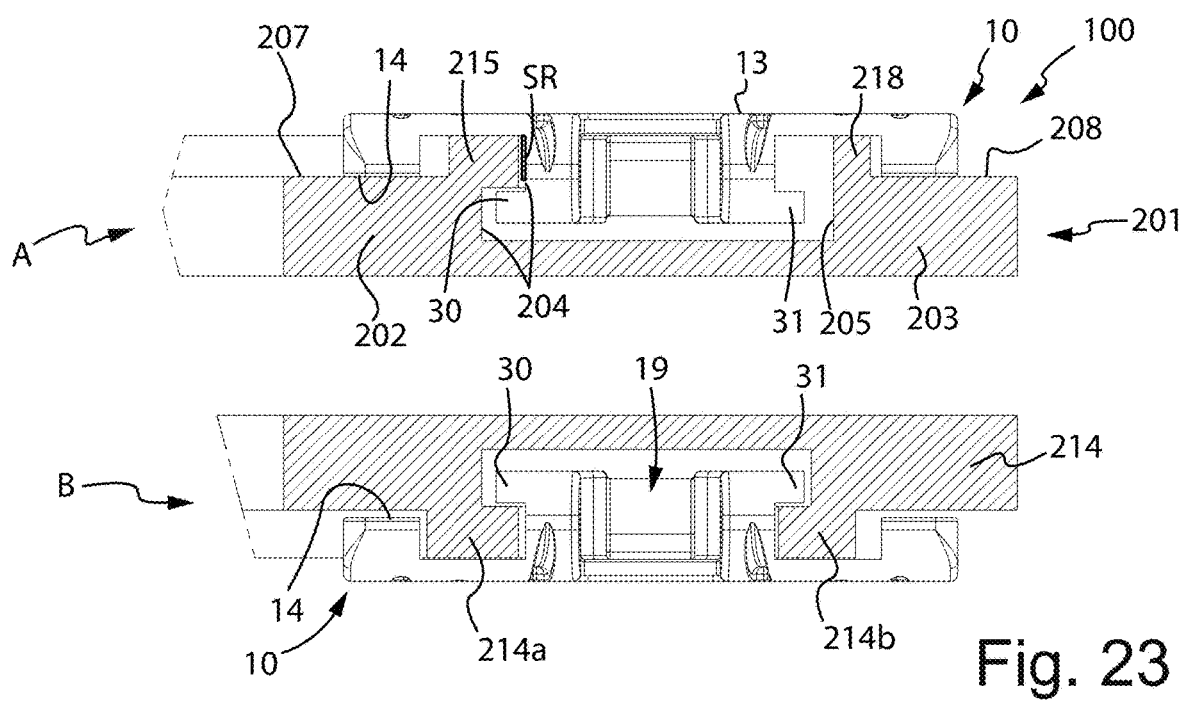

The embodiment shown in FIG. 23 differs from the one in FIG. 22 not only in the sizing of the grooves 26a, 26b and the second surface 14, but also in the fact that the teeth 30, 31 protrude externally from the articulation portion 19. In it, the guide body 202 on the inner side of the curved section has the lateral surface 204 shaped with at least one step (second step 217) or undercuts (the projection 15 is protruding towards the middle of the channel 206 to contact the sides of the articulation portion 19 above the teeth 30, 31). The return support 214 has a T-shaped groove whose fins 214a, 214b are shaped to fit in the grooves 26a, 26b below the teeth 30, 31.

Figure 24:
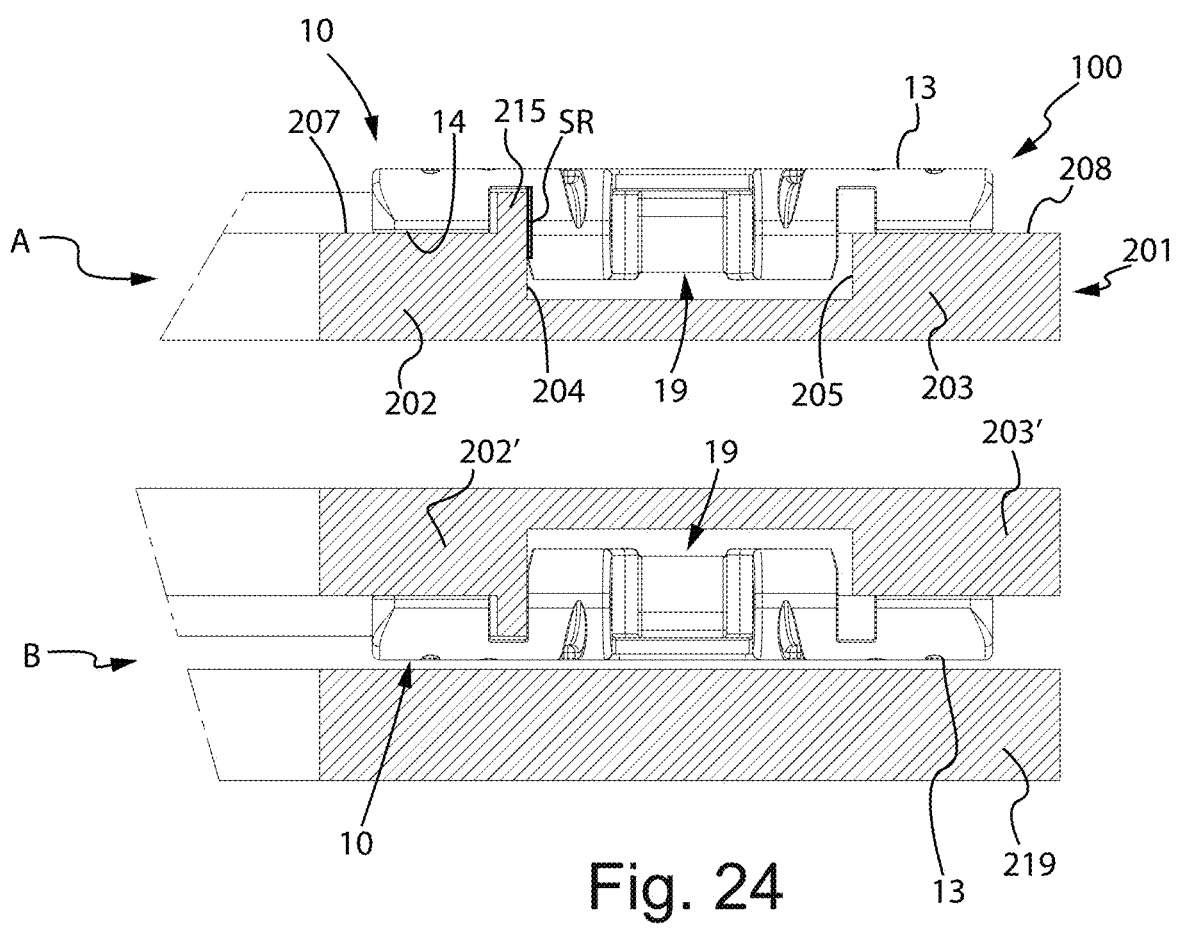

The embodiment shown in FIG. 24 differs from that of FIG. 18 in that the links do not have teeth 30, 31, in which case a further support plate 219 must be provided along the return path.

The present disclosure further provides a conveyor comprising at least one curved conveyor chain and a curved, forward and/or return guide support, as described above and as claimed.

It should be noted that details shown in the various embodiments and/or their shapes and/or sizes can be adopted and combined with each other even where not explicitly described.

The exact form and proportion of the various elements, unless otherwise specified, will depend on practical and design requirements.

The curvilinear conveyor chain according to the present disclosure has a high degree of stability and slidability even along the curved sections and is easy to assemble and disassemble.

The stability along curved sections of the conveyor chain according to the present disclosure is ensured by the resultant alone of the radial reaction force RR as described above, there being no other known retention elements or systems of known type, such as a magnetic system, opposite or facing retention tabs, inclined tabs ('bevels') or other.

The construction of the reaction surface SR—which, when the chain runs along curved stretches, is adapted to contact the lateral surface defining the inner side of the curved guide path—so that it extends for at least one section in the thickness of the plate body 12, as described above, makes it possible to limit the overall height and weight of the links and thus of the conveyor chain. In fact, it is possible to make the articulation pin housings so that they are closer to the product support surface (first surface 13 of the plate body 12). In a possible, but not exclusive (see FIG. 7), embodiment, the articulation pin housings can be made so that their longitudinal axes X-X lie on a plane intersecting the thickness of the plate body 12.

The curvilinear conveyor chain according to the present disclosure has the following advantages:

The links with which it is made have a low overall height and, in particular, reduced height with respect to links like those known for example from EP0527584B1. This, as has been seen, results in a lower overall weight, with consequently lower costs for the materials used in its production and a reduction in the drag required to move the chain and consequently the power needed to drag it. A lower overall height also makes it possible to reduce the so-called 'chordal effect' and to reduce the width of the openings which are generated between successive links when they engage with the drag gear wheels, which benefits the safe use of the chain.

It can be easily assembled and disassembled from the guide by simply lifting it from the guide which defines the forward path, both in the case of one-way and multi-way guides, without the chain and/or guides having to be disassembled, as is the case with the curvilinear conveyor chains provided with retention tabs.

In the embodiments in which teeth are provided for supporting the chain along the return path, the surface defining the support plane of the products (first surface 13) is preserved from unwanted wear which would be generated following contact with chain containment plates along the return path which would be otherwise necessary. This allows to have a substantially uniform product support surface.

It allows to reduce abnormal and uneven wear of the contact surfaces between the links and the guides, which is instead generated in chains whose links are fitted with inclined retention fins ('bevels'), thus allowing greater stability of the chain and therefore of the products resting thereon.

Both the links and the articulation pins, can be entirely made in thermoplastic material. However, this is not possible if the chain retention is magnetic.

The possibility of making the chain entirely of thermoplastic material allows it to be disposed of/recycled without the need to disassemble the components thereof (links and pins), as is the case when the pins are made of metal material either because they are adapted to react to a desired magnetic field or for reasons of sizing and mechanical resistance.

Even if the articulation pins are made of thermoplastic material, due to the sizing of their diameter and/or the design of the hinge, the chain according to the present disclosure has a mechanical strength in terms of maximum load in application of the equivalent chains with metal pins and in particular stainless steel.

The conveyor chain as well as the corresponding curved guide segment according to the present disclosure are interchangeable with already known conveyor chains and curved guides and allow the use of already known or existing standard raceways for the construction of straight sections.

It allows for structurally simpler and more economical construction of forward and return guides, in particular with respect to those of magnetic type.

The present disclosure also provides a curvilinear conveyor chain 100 adapted to slide along a guide comprising at least one curved section, in which the chain comprises a plurality of links 10 articulated to each other by respective articulation pins 11 and in which each link comprises a plate body 12 having a first surface 13 defining a support surface adapted to support products to be conveyed and an articulation portion 19 extending below the first surface 13 of the plate body and substantially in the middle thereof and comprising at least one pair of housings 20, 21 transverse to the travel direction of the conveyor chain along the guide 200 and each capable of accommodating a respective articulation pin 11 of the link having similar antecedent and subsequent links, respectively, in which the plate body 12 and the articulation portion 19 are made of a first thermoplastic material and in which the articulation pins 11 are made of a second thermoplastic material, the plate body 12 having, externally to the articulation portion 19, a maximum thickness S2 greater than 5 mm, advantageously between 8.7 mm and 12.7 mm, preferably 8.7 mm, and the articulation pins 11 having a diameter greater than 5 mm, preferably between 7 mm and 10 mm and even more preferably 8 mm.

Advantageously, the plate body 12 and the articulation portion 19 are made in a single body by injection moulding.

In particular, the link 10 can be made of a first thermoplastic material and the articulation pins 11 can be made of a second thermoplastic material. In a preferred embodiment, the first thermoplastic material and the second thermoplastic material belong to the same polymeric family and, for example, are chosen from the acetal resin group (POM polyoxymethylene).

Advantageously, the first thermoplastic material and the second thermoplastic material have different mechanical and/or physical features; for example, they may have a different wear resistance and/or a different coefficient of friction.

In particular, the link 10 can be made of lubricated acetal resin with low friction coefficient features, while the pins 11 are instead made of acetal resin with high mechanical strength features. The opposite is not excluded.

By making the links 10 and pins 11 of homologous, related or compatible polymeric materials, meaning polymeric materials which, belonging to the same polymeric family, can be disposed of/recycled together or in a single supply chain, it is possible to dispose of/recycle the chain 100 in its entirety, without the need to disassemble its components and to differentiate its disposal and/or recycling.

Altogether, the plate body 12 comprises a pair of wings 12a, 12b extending from the opposite sides of the articulation portion 19, each of which has:
  a first portion having a first thickness S1 and
  a second portion having a second thickness S2, where the second thickness S2 is greater than the first thickness S1 and is the maximum thickness which the plate body 12 has externally to the articulation portion 19.

The plate body 12 comprises below the first surface 13 a second surface 14 which consists of the lower surface of the wings 12a, 12b at their second portion of thickness equal to the second thickness S2 (maximum thickness).

In a preferred embodiment, the first and the second portion of each wing follow each other starting from the respective side of the articulation portion 19.

In such a case, the first portion of each of the two wings 12a, 12b is laterally delimited by the second portion of the respective wing 12a, 12b and the corresponding side of the articulation portion 19.

Preferably, S1 is the minimum thickness which the plate body 12 has externally to the articulation portion 19.

Advantageously, the first thickness S1 is less than or equal to half of the second thickness S2 (S1<S2/2).

The first thickness S1 is determined as a function of the minimum mechanical strength of the plate body 12.

The second thickness S2 is also determined as a function of the flanking of chain 100 with other chains or conveyors.

For example, the first thickness S1 can vary between 3 mm and 5 mm and the second thickness S2 is greater than 5 mm.

Advantageously, the second thickness S2 is greater than twice the first thickness S1 or regardless at least 5 mm greater than the first thickness S1. In a possible embodiment, the first thickness S1 (minimum thickness) is between 3 mm and 5 mm and the second thickness S2 (maximum thickness) is between 8.7 mm and 12.7 mm: 3 mm≤S1≤5 mm and 8.7 mm≤S2≤12.7 mm.

The conveyor chain, relative links and curved guide segments thus conceived are susceptible to numerous modifications and variations, all of which are covered by the disclosure; furthermore, all the details are replaceable by technically equivalent elements. In practice, the materials used, as well as their dimensions, can be of any type according to the technical requirements.

The invention claimed is:

1. A link of a curvilinear conveyor chain suitable for running along a guide comprising at least one curved section, said curved section comprising a pair of guide bodies spaced apart from each other and having respective side surfaces which are faced to each other and which define a curved path, wherein one of said lateral surfaces defines the inner side of said curved path and the other of said lateral surfaces defines the outer side of said curved path, wherein said link comprises:
   a plate body having:
      a first surface defining a support surface adapted to support products to be transported,
      below said first surface, a second surface substantially flat and defining at least one plane resting and sliding on at least one respective support surface of a raceway of straight sections of said guide,
      an articulation portion extending below said first surface of said plate body and substantially in the middle thereof, and comprising at least a pair of housings transverse to the travel direction (DS) of said conveyor chain along said guide and adapted to accommodate each a respective articulation pin of said link with similar links, respectively preceding and following, to form said conveyor chain,
   wherein said link has at least one substantially flat reaction surface (SR) extending below said first surface of said plate body in a plane transverse to the longitudinal axes (X-X) of said articulation pins and which, when said conveyor chain runs along said at least one curved section, is adapted to contact at least a portion of the lateral surface defining the inner side of said curved path to generate a radial reaction force (RR) acting on said link along a direction of action (DRR) extending above said longitudinal axes (X-X) of said articulation pins, wherein said reaction surface (SR) comprises at least one section extending above said second surface of said plate body interpenetrating it.

2. The link according to claim 1, wherein said plate body comprises below said first surface at least one substantially straight groove extending substantially parallel to said travel direction (DS) and an inner sidewall that at least partially defines said reaction surface (SR).

3. The link according to claim 1, wherein said plate body comprises a pair of wings extending from opposite sides of said articulation portion and each wing of said pair of wings has: a first portion having a first thickness (S1) and a second portion having a second thickness (S2), wherein said second thickness (S2) is greater than said first thickness (S1) and wherein said second surface of said plate body comprises the bottom surface of said wings at said respective second portion thereof and wherein said at least one reaction surface (SR) is defined at said first portion of at least one of said two wings.

4. The link according to claim 3, wherein the distance (Hp) between said longitudinal axes (X-X) and said first surface (13) is greater than or equal to the sum of said first thickness (S1) and half of the height ($H_{SR}$) of said reaction surface (SR) contacting said portion of the lateral surface defining the inner side of said curved path measured orthogonally to said first surface (13): Hp≥S1+($H_{SR}$/2), with S1<S2.

5. The link according to claim 3, wherein said second thickness (S2) is greater than or equal to twice said first thickness (S1).

6. The link according to claim 3, wherein said first thickness (S1) ranges from 3 mm to 5 mm and said second thickness (S2) is greater than 5 mm, wherein the difference between said first thickness (S1) and said second thickness (S2) is of at least 5 mm.

7. The link according to claim 1, wherein said plate body has, externally to said articulation portion, a maximum thickness greater than 5 mm.

8. The link according to claim 1, wherein each of said articulation pins has a diameter greater than 5 mm.

9. The link according to claim 1, wherein the longitudinal axis (X-X) of each of said articulation pins extends along a direction lying in a plane parallel to said second surface of said plate body and which is located between said first surface and said second surface of said plate body.

10. The link according to claim 1, further comprising at least one pair of teeth projecting in a direction transverse to said travel direction (DS) of said conveyor chain, said teeth being defined, facing or opposing each other, below said first surface of said plate body and being capable of slidingly engaging with a complementary return support of said conveyor chain.

11. The link according to claim 10, wherein said teeth are obtained at said articulation portion below said second surface of said plate body.

12. A curvilinear conveyor chain comprising a plurality of links according to claim 1 articulated to each other by said articulation pins.

13. The curvilinear conveyor chain according to claim 12, wherein each of said links is made of a first thermoplastic material and each of said articulation pins is made of a second thermoplastic material.

14. The curvilinear conveyor chain according to claim 13, wherein said first thermoplastic material and said second thermoplastic material belong to the same polymeric family.

15. A curved guide segment for a curvilinear conveyor chain according to claim 12, comprising a pair of guide bodies spaced apart from each other and having respective side surfaces facing each other delimiting a curved path, wherein one of said lateral surfaces defines the inner side of said curved path and the other of said lateral surfaces defines the outer side of said curved path, wherein said guiding body whose lateral surface defines the inner side of said curved path includes at its top a first flat surface on which is superimposed said second surface of said plate bodies and at least one longitudinal projection projecting from said first flat surface and forming with it a first step, wherein the side of said projection faced to the lateral surface defining the outer side of said curved path forms at least in part the portion of said lateral surface adapted to contact said reaction surface (SR) of said links.

16. The curved guide segment according to claim 15, wherein the sidewall of said protrusion faced to the lateral surface defining the outer side of said curved path constitutes said portion of said lateral surface adapted to contact said reaction surface (SR) of said link, said protrusion forming a second step at said lateral surface.

17. The curved guide segment according to claim 15, further comprising a return support of said conveyor chain extending parallel to and below said curved path and having along its longitudinal development at least one pair of transverse fins on which pairs of teeth protruding transversely from each of said links slideably support said conveyor chain along the return path.

18. A curvilinear conveyor chain suitable for sliding along a guide comprising at least one curved section, wherein said conveyor chain comprises a plurality of links articulated to each other by respective articulation pins and wherein each of said links comprises a plate body having a first surface defining a support surface adapted to support products to be conveyed and an articulation portion extending below said first surface of said plate body and substantially in the middle thereof and comprising at least a pair of housings transverse to the travel direction (DS) of said conveyor chain along said guide and suitable for accommodating each a respective articulation pin of said link with similar antecedent and subsequent links, respectively, wherein said plate body and said articulation portion are made of a first thermoplastic material and by the fact that said articulation pins are made of a second thermoplastic material, wherein said first thermoplastic material and said second thermoplastic material belong to the same polymeric family, and wherein said plate body has, externally to said articulation portion, a maximum thickness (S2) greater than 5 mm and said articulation pins have a diameter greater than 5 mm.

19. The curvilinear conveyor chain according to claim 18, wherein said maximum thickness (S2) is between 8.7 mm and 12.7 mm.

20. The curvilinear conveyor chain according to claim 18, wherein said articulation pins have a diameter between 5 mm and 10 mm.

* * * * *